US012190272B2

(12) United States Patent
Leffler et al.

(10) Patent No.: US 12,190,272 B2
(45) Date of Patent: Jan. 7, 2025

(54) METHODS, SYSTEMS, AND DEVICES FOR COLLABORATIVE DESIGN OF AN EQUIPMENT SITE

(71) Applicant: AT&T Intellectual Property I, L.P., Atlanta, GA (US)

(72) Inventors: Benjamin J. Leffler, Galena, OH (US); Amanda Jean Peterlin, Petersburg, MI (US); Jeffrey Patrick Thomas, Romeo, MI (US); Richard Raley, Point Venture, TX (US); Alicia Shewring, Canal Winchester, OH (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 314 days.

(21) Appl. No.: 17/370,447

(22) Filed: Jul. 8, 2021

(65) Prior Publication Data
US 2023/0008703 A1    Jan. 12, 2023

(51) Int. Cl.
| | |
|---|---|
| *G06Q 10/0639* | (2023.01) |
| *G06N 20/00* | (2019.01) |
| *G06V 10/22* | (2022.01) |
| *G06V 20/00* | (2022.01) |

(52) U.S. Cl.
CPC ........ *G06Q 10/0639* (2013.01); *G06N 20/00* (2019.01); *G06V 10/235* (2022.01); *G06V 20/00* (2022.01)

(58) Field of Classification Search
CPC .... G06Q 10/0639; G06N 20/00; G06N 20/10; G06V 20/00; G06V 10/235
See application file for complete search history.

(56) References Cited

U.S. PATENT DOCUMENTS

| | | | |
|---|---|---|---|
| 10,546,424 B2* | 1/2020 | Pang | H04N 13/156 |
| 11,106,327 B2* | 8/2021 | Mani | G06F 8/60 |
| 11,355,025 B2* | 6/2022 | Wallace | G06F 3/011 |
| 11,593,538 B2* | 2/2023 | Procaccioli | G06F 30/18 |
| 2020/0320173 A1* | 10/2020 | Procaccioli | G06Q 10/0639 |
| 2022/0262224 A1* | 8/2022 | Hanson | G06T 7/73 |
| 2022/0360608 A1* | 11/2022 | Raleigh | H04L 47/2408 |

\* cited by examiner

*Primary Examiner* — Dylan C White
(74) *Attorney, Agent, or Firm* — Guntin & Gust, PLC; Kenneth S. Kwan

(57) ABSTRACT

Aspects of the subject disclosure may include, for example, obtaining and aggregating first image content of an equipment site resulting in first aggregated image content, and providing the first aggregated image content to communication devices that render it on a respective display. Further embodiments include identifying first equipment from first user-generated input, and adjusting the first aggregated image content with a first equipment image resulting in second aggregated image content. Additional embodiments include identifying second equipment from second user-generated input, and adjusting the second aggregated image content with a second equipment image resulting in third aggregated image content. Also, embodiments include determining that installation of the second equipment does not satisfy an installation threshold in response to analyzing the third aggregated image content, and providing a notification to the communication devices indicating the installation of the second equipment does not satisfy the installation threshold. Other embodiments are disclosed.

20 Claims, 20 Drawing Sheets

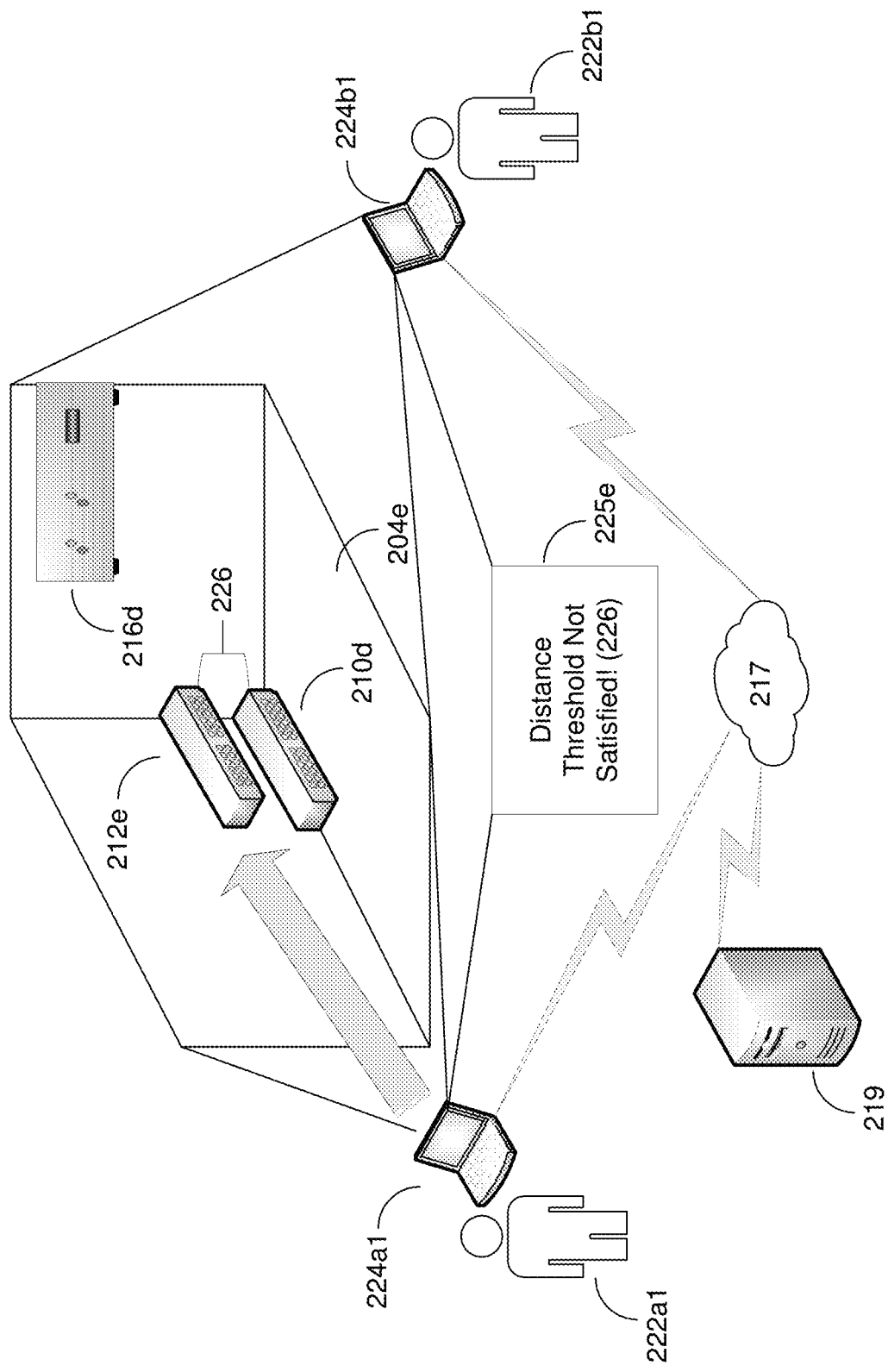

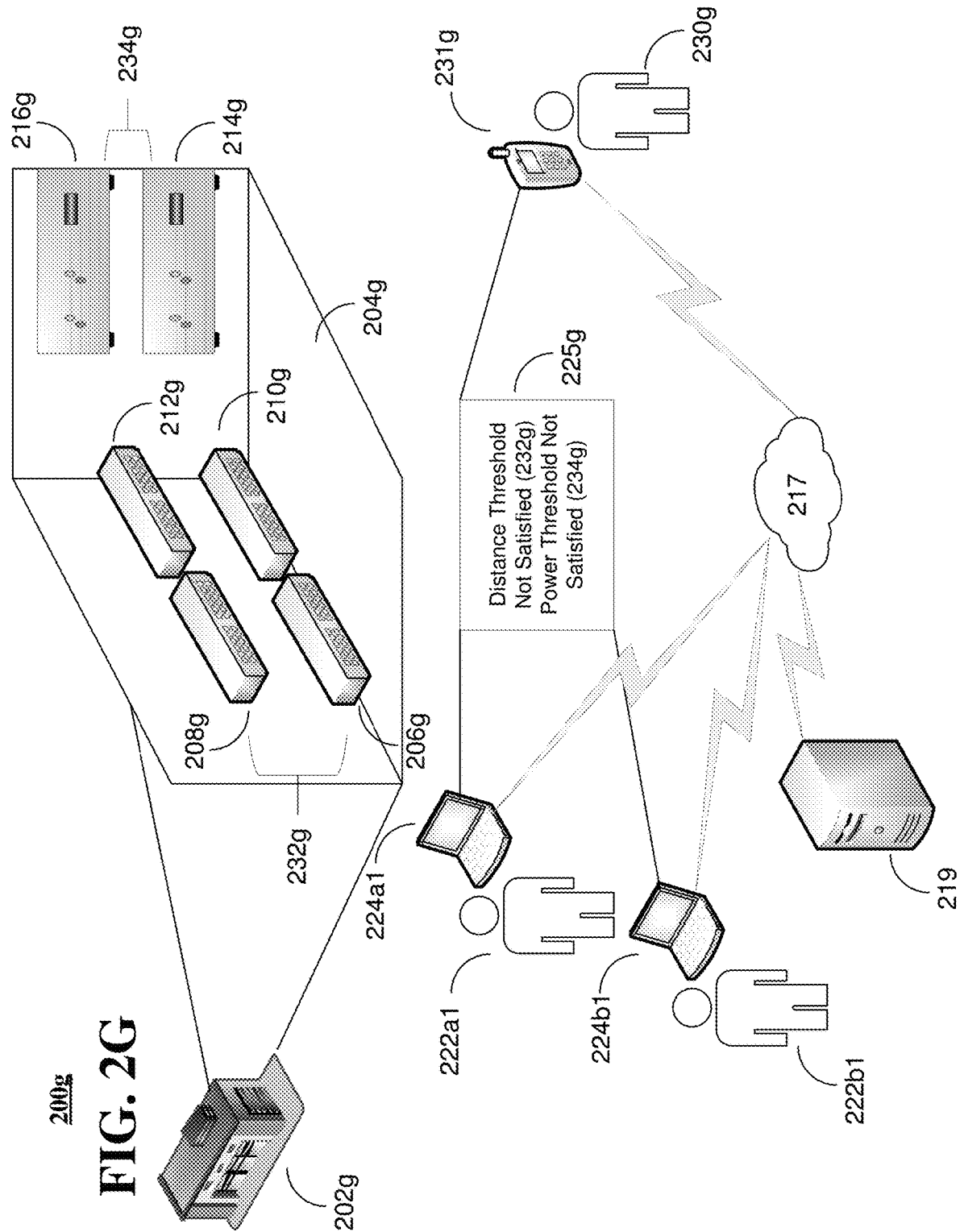

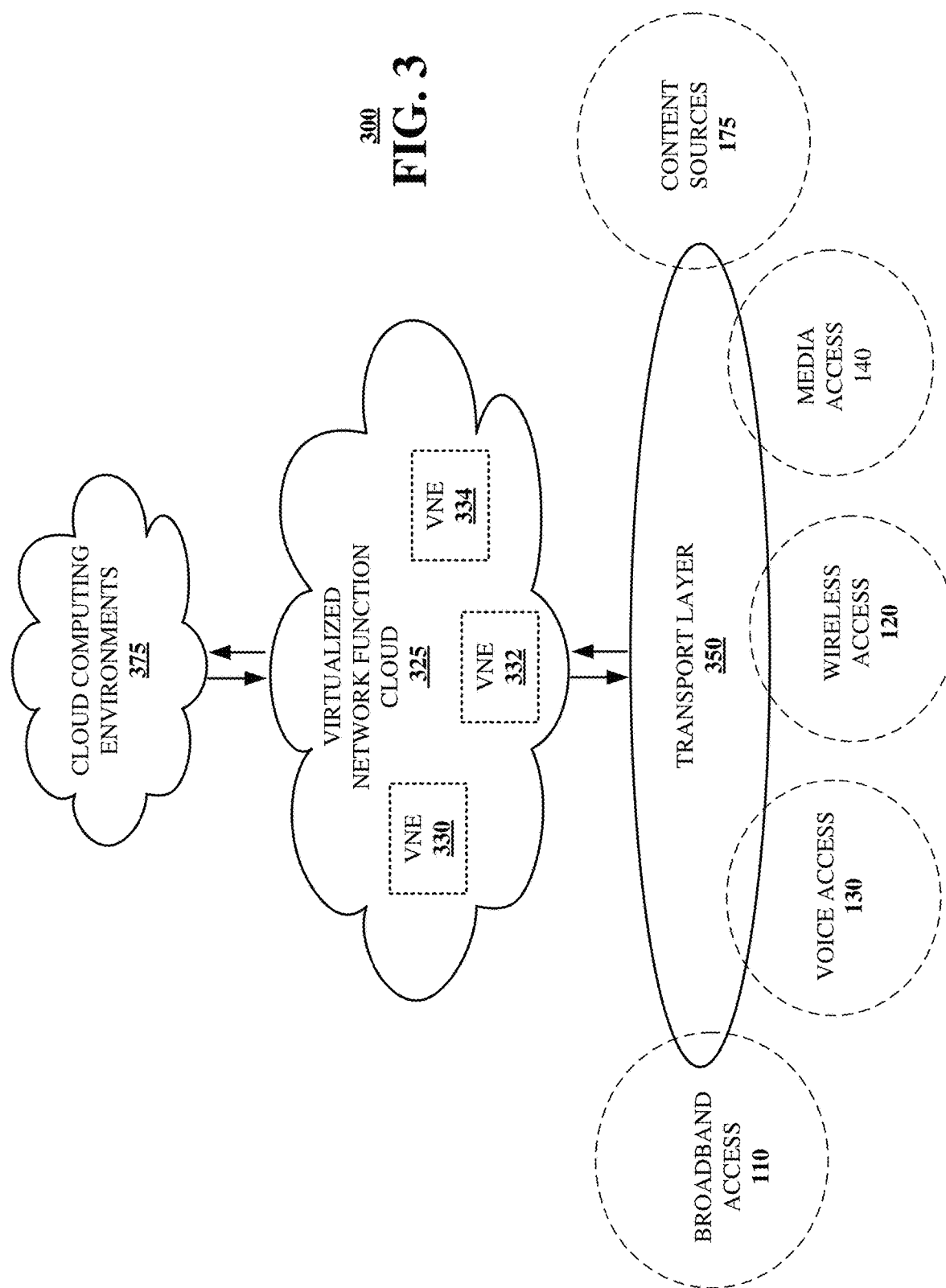

600

METHODS, SYSTEMS, AND DEVICES FOR COLLABORATIVE DESIGN OF AN EQUIPMENT SITE

FIELD OF THE DISCLOSURE

The subject disclosure relates to methods, systems, and devices for collaborative design of an equipment site.

BACKGROUND

Traditionally, equipment site for data centers and telecommunication centers have been designed utilizing tedious processes that include the need for onsite inspection of the equipment site and manual design. These process not only were time consuming but limited the number of people that could collaborate on the design of the equipment site.

BRIEF DESCRIPTION OF THE DRAWINGS

Reference will now be made to the accompanying drawings, which are not necessarily drawn to scale, and wherein:

FIGS. 2A-2H are block diagrams illustrating example, non-limiting embodiments of systems functioning within the communication network of FIG. 1 in accordance with various aspects described herein.

FIG. 3 is a block diagram illustrating an example, non-limiting embodiment of a virtualized communication network in accordance with various aspects described herein.

DETAILED DESCRIPTION

Figure 1:
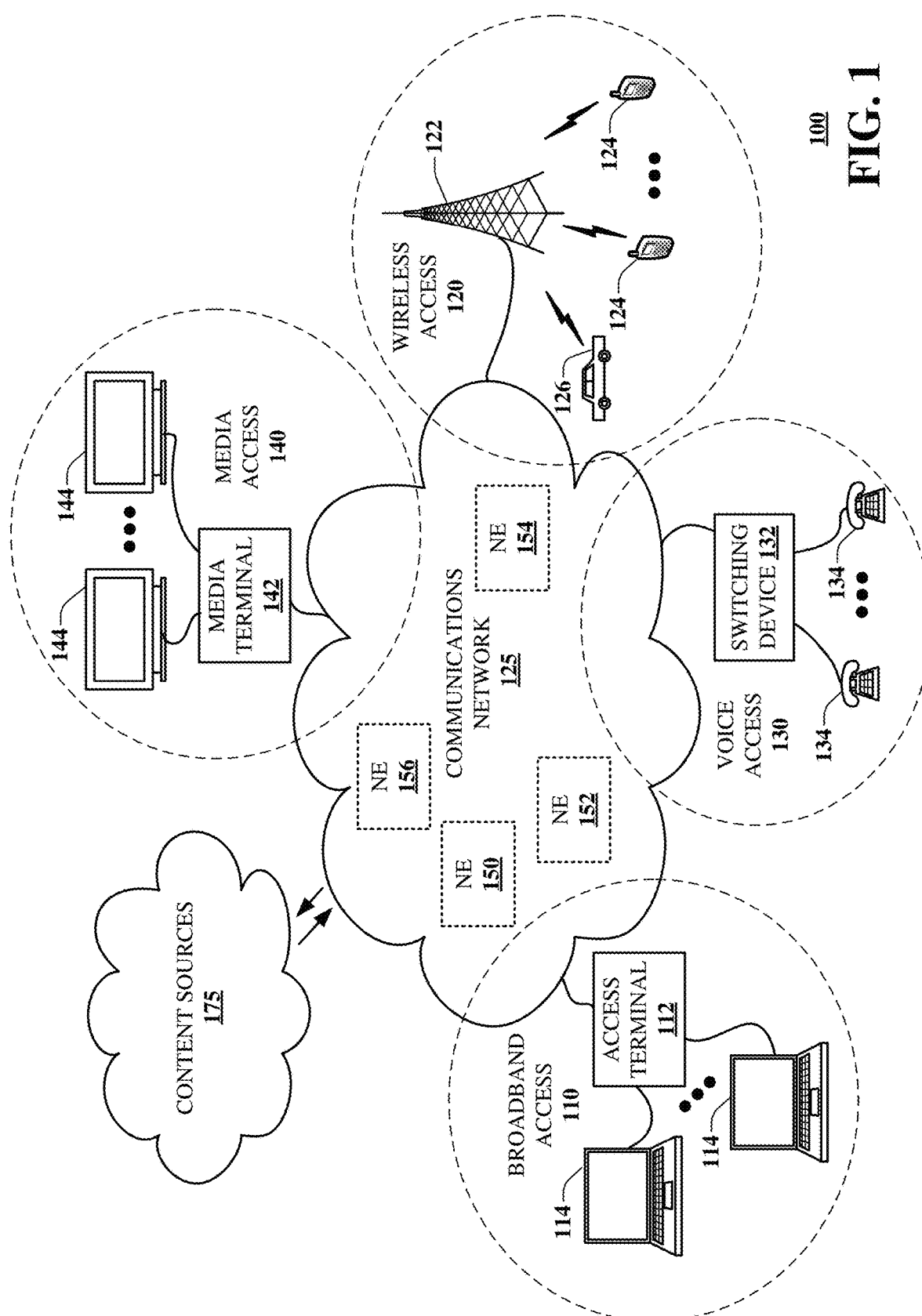
FIG. 1 is a block diagram illustrating an exemplary, non-limiting embodiment of a communications network in accordance with various aspects described herein.

The subject disclosure describes, among other things, illustrative embodiments that can include obtaining a first group of image content of an equipment site, aggregating the first group of image content resulting in first aggregated image content, and providing the first aggregated image content to a group of communication devices, each of the group of communication devices renders the first aggregated image content on a respective display of each of the group of communication devices. Further, embodiments can include receiving first user-generated input from a first communication device of the group of communication devices, identifying first equipment to install at the equipment site according to the first user-generated input, and adjusting the first aggregated image content by incorporating an image of the first equipment resulting in a second aggregated image content. Additional embodiments can include receiving second user-generated input from a second communication device of the group of communication devices, identifying second equipment to install at the equipment site according to the second user-generated input, and adjusting the second aggregated image content by incorporating an image of the second equipment resulting in a third aggregated image content. Also, embodiments can include determining that installation of the second equipment does not satisfy an installation threshold resulting in a first determination in response to analyzing the third aggregated image content utilizing a machine learning application, and providing a first notification indicating the installation of the second equipment does not satisfy the installation threshold based on the first determination to each of the group of communication devices. Other embodiments are described in the subject disclosure.

One or more aspects of the subject disclosure include a device, comprising a processing system including a processor, and a memory that stores executable instructions that, when executed by the processing system, facilitate performance of operations. The operations can comprise obtaining a first group of image content of an equipment site, aggregating the first group of image content resulting in first aggregated image content, and providing the first aggregated image content to a group of communication devices, each of the group of communication devices renders the first aggregated image content on a respective display of each of the group of communication devices. Further operations can comprise receiving first user-generated input from a first communication device of the group of communication devices, identifying first equipment to install at the equipment site according to the first user-generated input, and adjusting the first aggregated image content by incorporating an image of the first equipment resulting in a second aggregated image content. Additional operations can comprise receiving second user-generated input from a second communication device of the group of communication devices, identifying second equipment to install at the equipment site according to the second user-generated input, and adjusting the second aggregated image content by incorporating an image of the second equipment resulting in a third aggregated image content. Also, operations can comprise determining that installation of the second equipment does not satisfy an installation threshold resulting in a first determination in response to analyzing the third aggregated image content utilizing a machine learning application, and providing a first notification indicating the installation of the second equipment does not satisfy the installation threshold based on the first determination to each of the group of communication devices.

One or more aspects of the subject disclosure include a non-transitory, machine-readable medium, comprising executable instructions that, when executed by a processing system including a processor, facilitate performance of operations. The operations can comprise obtaining a first group of image content of an equipment site, aggregating the first group of image content resulting in first aggregated image content, and providing the first aggregated image content to a group of communication devices, each of the group of communication devices renders the first aggregated image content on a respective display of each of the group of communication devices. Further operations can comprise receiving first user-generated input from a first communication device of the group of communication devices, identifying first equipment to install at the equipment site according to the first user-generated input, determining a first location associated with the first equipment within the equipment site according to the first user-generated input, and adjusting the first aggregated image content by incorporating an image of the first equipment according to the first location resulting in a second aggregated image content. Additional operations can comprise receiving second user-generated input from a second communication device of the group of communication devices, identifying second equipment to install at the equipment site according to the second user-generated input, determining a second location associated with the second equipment within the equipment site according to the second user-generated input, and adjusting the second aggregated image content by incorporating an image of the second equipment according the second location resulting in a third aggregated image content. Also, operations can comprise determining that installation of the second equipment at the second location does not satisfy an installation threshold resulting in a first determination in response to analyzing the third aggregated image content utilizing a machine learning application, and providing a first notification indicating the installation of the second equipment does not satisfy the installation threshold based on the first determination to each of the group of communication devices.

One or more aspects of the subject disclosure include a method. The method can comprise obtaining, by a processing system including a processor, a first group of image content of an equipment site, aggregating, by the processing system, the first group of image content resulting in first aggregated image content, and providing, by the processing system, the first aggregated image content to a group of communication devices, each of the group of communication devices renders the first aggregated image content on a respective display of each of the group of communication devices. Further, the method can comprise receiving, by the processing system, a group of user-generated input from a portion of the group of communication devices, identifying, by the processing system, a group of equipment to install at the equipment site according to the group of user-generated input, and adjusting, by the processing system, the first aggregated image content by incorporating images of the group of equipment resulting in a second aggregated image content. In addition, the method can comprise providing, by the processing system, the second aggregated image content to the group of communication devices, each of the group of communication devices renders the second aggregated image content on the respective display of each group of communication devices. Also, the method can comprise obtaining, by the processing system, a second group of image content of the equipment site from a third communication device associated with an installer of equipment associated with the equipment site, and aggregating, by the processing system, the second group of image content resulting in a third aggregated image content, the third aggregated image content shows a completed installation of the equipment at the equipment site. Further, the method can comprise determining, by the processing system, the completed installation of the equipment does not satisfy an installation threshold resulting in a determination in response to analyzing, by the processing system, the third aggregated image content utilizing a machine learning application, and providing, by the processing system, a notification indicating that the completed installation of the equipment does not satisfy the installation threshold based on the determination to each of the group of communication devices.

Referring now to FIG. 1, a block diagram is shown illustrating an example, non-limiting embodiment of a system 100 in accordance with various aspects described herein. For example, system 100 can facilitate in whole or in part to collaboratively design an equipment site. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
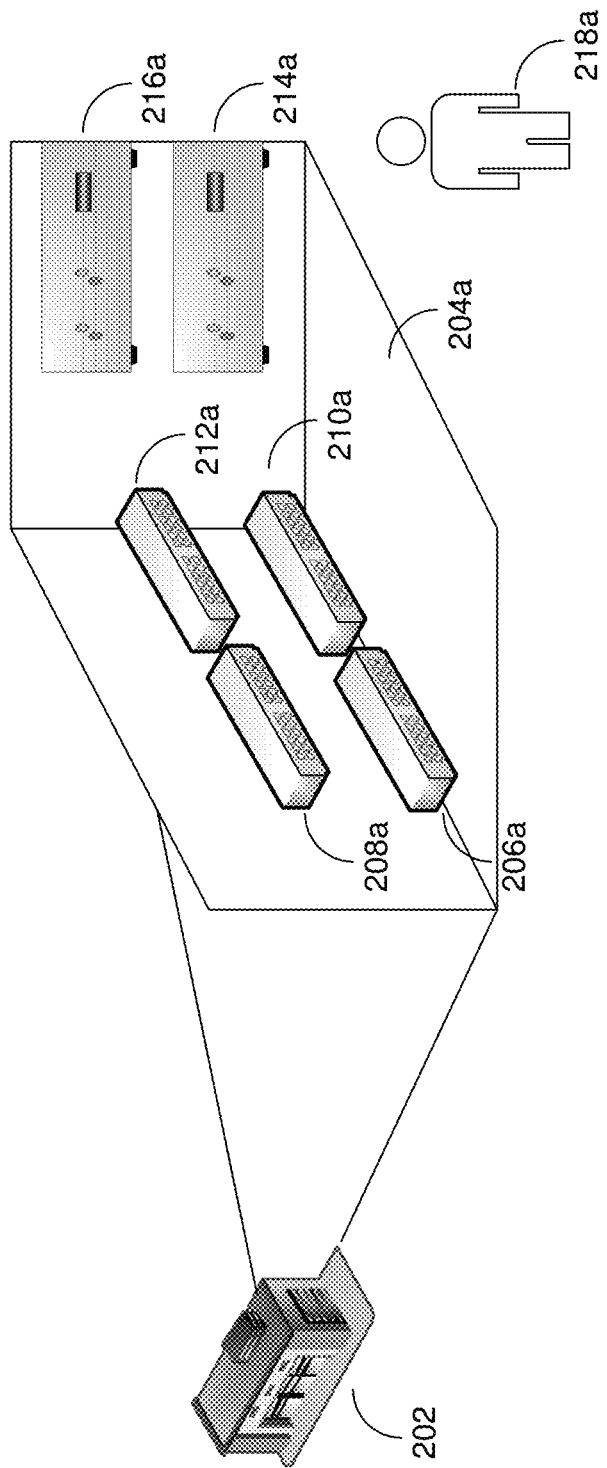

FIGS. 2A-2H are block diagrams illustrating example, non-limiting embodiments of systems functioning within the communication network of FIG. 1 in accordance with various aspects described herein. Referring to FIG. 2A, in one or more embodiments, system 200a can include a telecommunication operations center 202 that comprises an equipment site 204a for a data center, telephone center, telecommunications center, or a combination thereof. Further, embodiments described herein can be applied to equipment site design for a data center or telecommunication operations center, however, embodiments can also be applied to the equipment site design for any other industry (e.g., home/commercial decor, appliance installations, factory installations, etc.) The equipment site 204a can be managed by an operator personnel 218a of an operator entity that controls or manages the equipment site 204a or telecommunications operations center 202. Embodiments described herein, discuss way in which different operator personnel 218a can design, installation, and approval of installation of the equipment 206a, 208a, 210a, 212a, 214a, 216a of equipment site 204a to meet certain installation requirements (i.e., thresholds—e.g., distance between equipment, equipment on a power line, supported bandwidth for a portion (e.g., rack) of the equipment, processing power of a portion (e.g., rack) of equipment, memory capacity of a portion (e.g., rack) of equipment, etc.). Further, aspects of the design, installation and approval of installation can be performed by different operator personnel remotely or in a virtual reality/augmented reality environment. This allows a larger group of stakeholders associated with the equipment site to collaborate in its design than having the design conducted onsite.

Figure 2B:
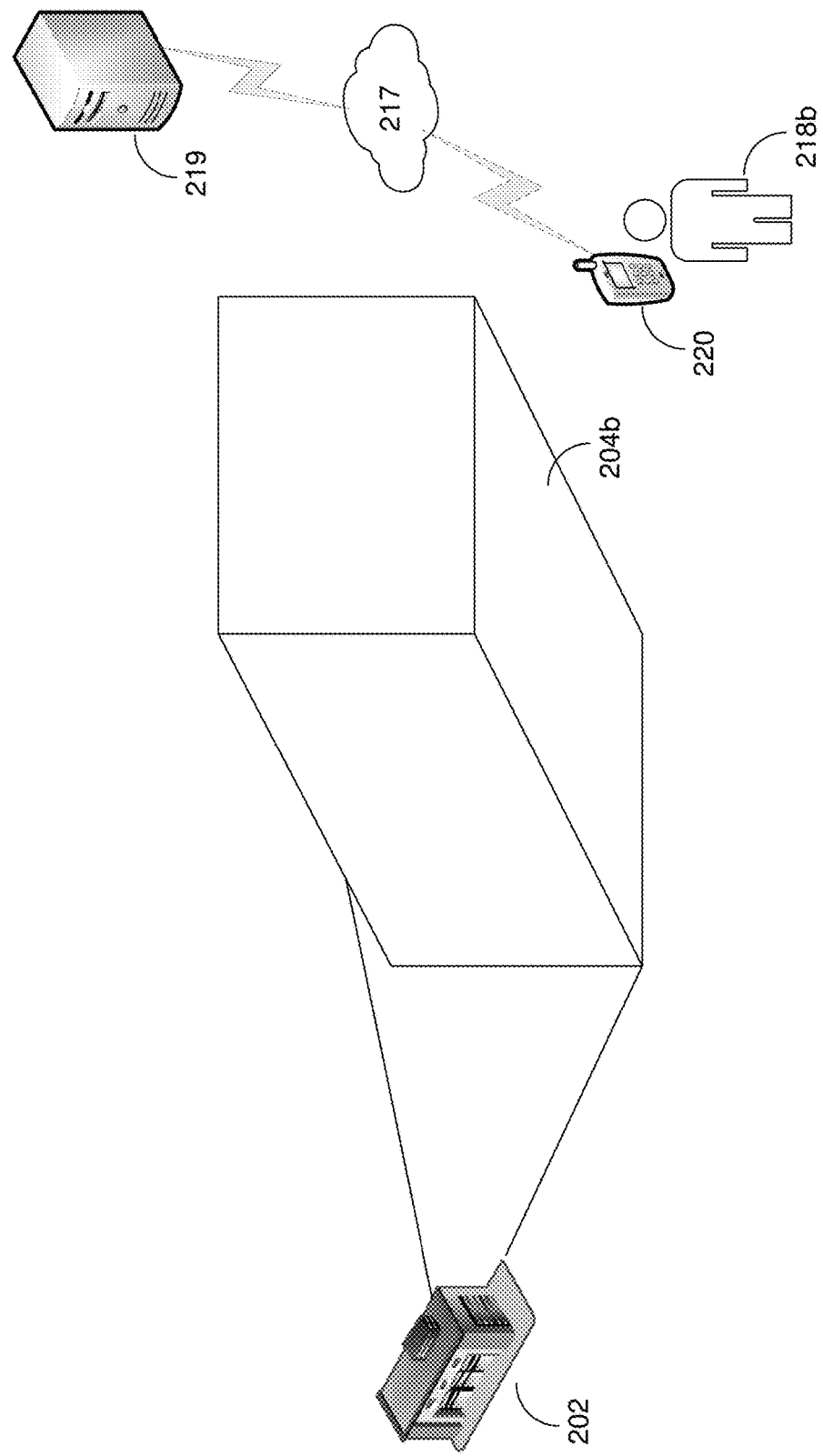

Referring to FIG. 2B, in one or more embodiments, system 200b can include operator personnel 218b obtaining image content (e.g., 3D Site scans, a group of still images, video content, group of video content, etc.) of an equipment site 204b within a telecommunication center 202 utilizing a camera on a communication device 220. The communication device 220 can include, but is not limited to, a mobile phone, smartphone, tablet computer, laptop computer, mobile or any other communication device. Further, the image content associated with the equipment site 204b and captured by communication device 220 can be provided to a server 219 over a communication network 217. In addition, the communication network 217 can include a wired communication network, wireless communication network, or a combination thereof. Server 219 can comprise one server, a group of servers residing in the same location or spanning multiple locations, a virtual server, a group of virtual servers residing in the same location or spanning multiple locations, one or more cloud servers, or any combination thereof.

Figure 2C:
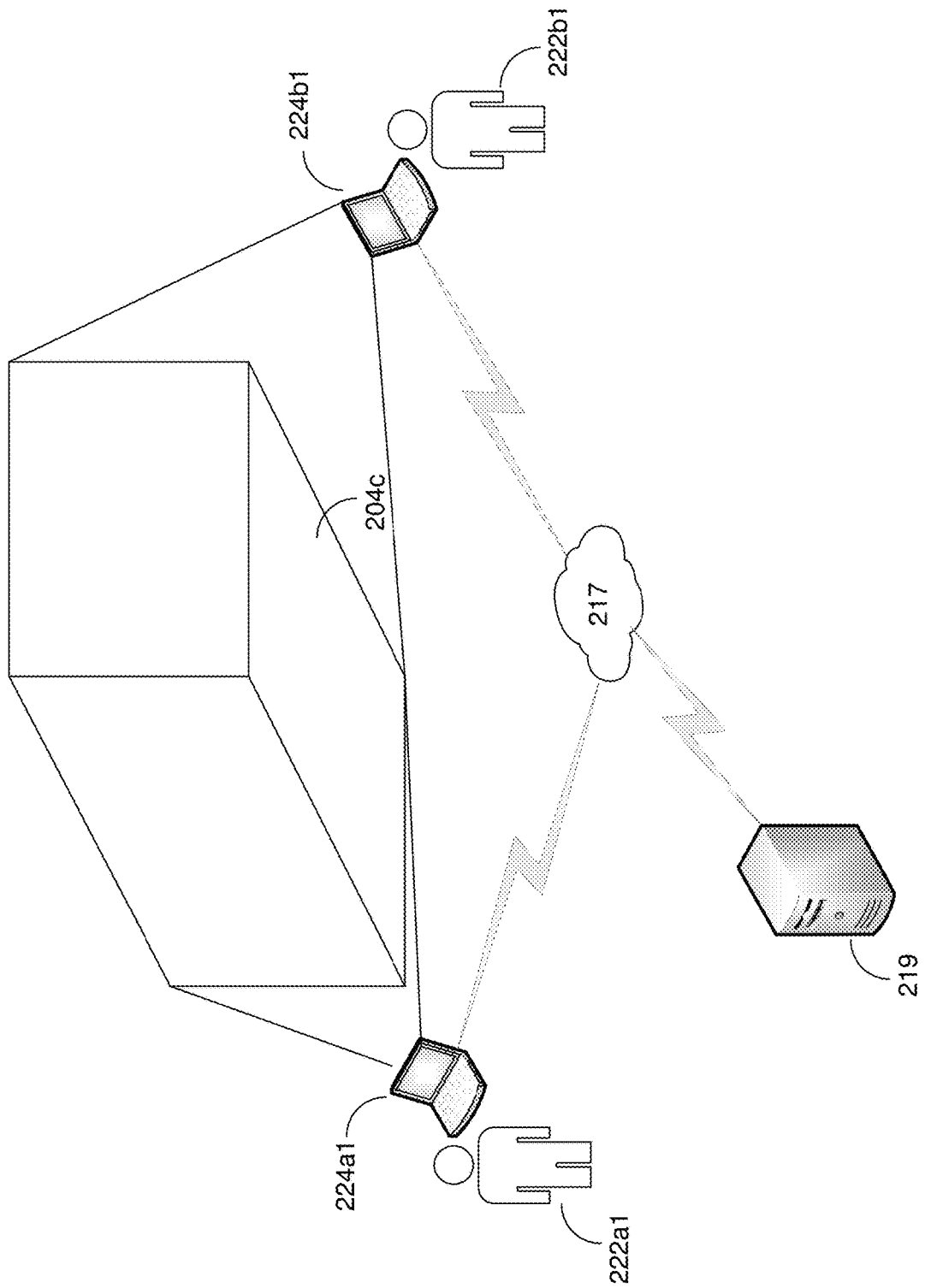

Referring to FIG. 2C, in one or more embodiments, the system 200c can include server 219, communication network 217, communication device 224a1 associated with user 222a1, and communication device 224b1 associated with user 222b1. Both user 222a1 and user 222b1 can be operator personnel that are stakeholders in the design of the equipment site 204c. Further, communication device 224a1 and communication device 224b1 can each comprise a mobile device, mobile phone, tablet computer, laptop computer, desktop computer, virtual reality device, augmented reality device, any other communication device, or any combination thereof.

In one or more embodiments, server 219 can aggregate image content (3D Site scans, still images, video content, group of video content, etc.) of equipment site 204b obtained from communication device 220 resulting in aggregated image content, which can include, but are not limited to, a group of still images, Lidar scans, 3D environment templates, video content, group of video content, panoramic video content, virtual reality video content, augmented reality video content, etc. Further, the aggregated image content can be provided by the server 219 over communication network 217 to each of communication device 224a1 and communication device 224b1. In addition, each of communication device 224a1 and communication device 224b1 can render the aggregated image content on a respective display of communication device 224a1 and communication device 224b1 utilizing a graphical user interface (GUI) of an equipment design software application that utilizes machine learning. The aggregated image content show equipment site 204c. That is, the rendered aggregated image content is a scaled version (in terms of dimensions) of the equipment site 204b that can be utilized by user 222a1 and 222b1 to design the equipment site with different types of equipment.

Figure 2D:
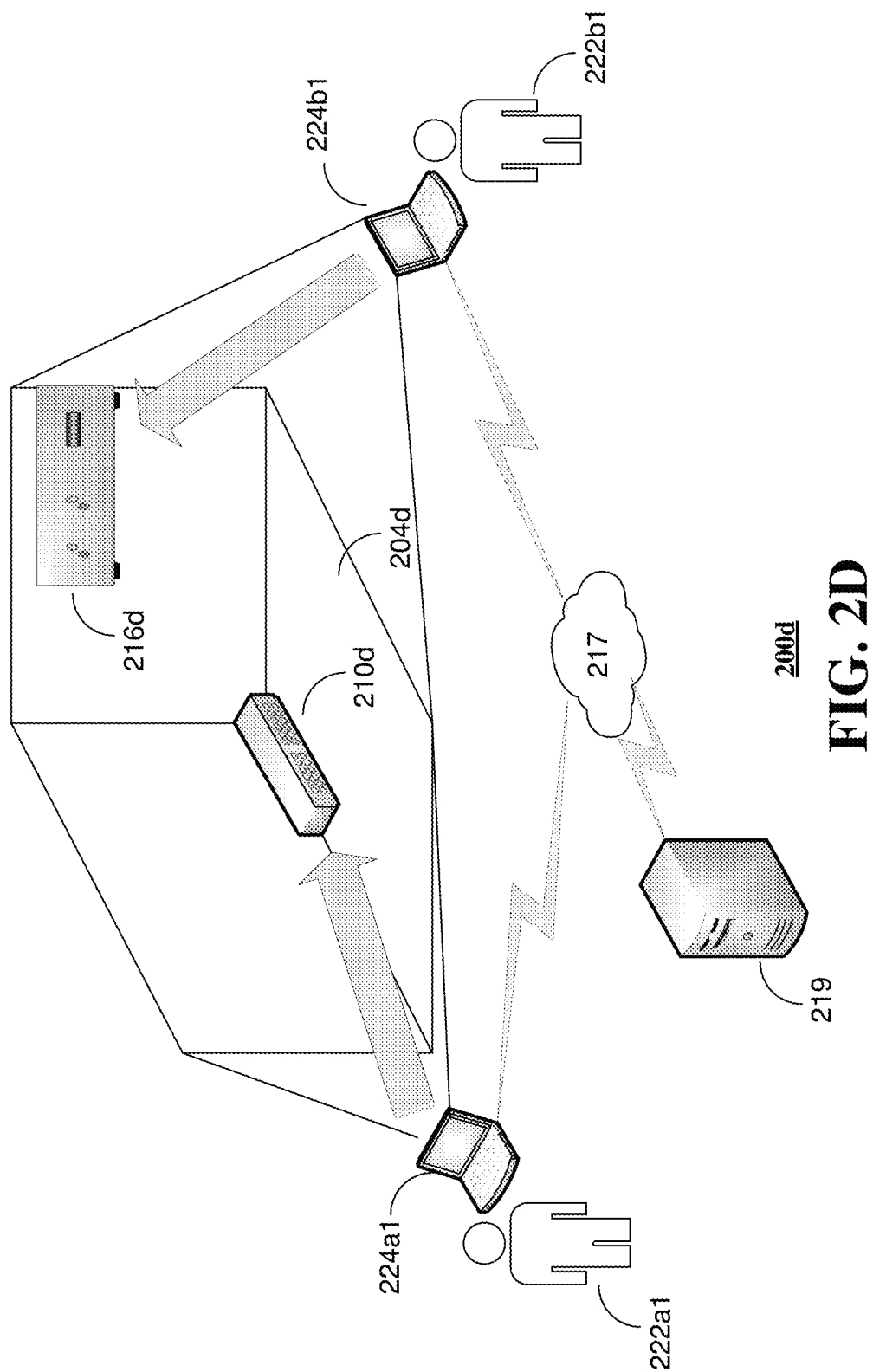

Referring to FIG. 2D, in one or more embodiments, the system 200d comprises communication device 224a1 associated with user 221a1 and communication device 224b1 associated with user 222b1 as well as server 219 and communication network 217. The server 219 can receive user-generated input from communication device 224a1. The user-generated input can indicate equipment 210d. For example, the communication device 224a1 can render the GUI associated with the design software application, which displays the aggregated image content 204c of the equipment site. The GUI can include a dialog box in which the user 222a1 can input the name of equipment 210d. Upon receiving the name of the equipment, the GUI can provide an image of the equipment from a library of equipment images such that the user 222a1 can select the image and place it at a location within the aggregate image of the equipment site 204c. In another example, the GUI can provide an access to the library of images of different equipment from which the user 222a1 can utilize a drag and drop feature of the GUI to select an image of equipment 210d from a group of equipment images and move the image onto a location within the aggregated image content of the equipment site 204c. The image of the equipment 210d, name of the equipment 210d, type of equipment 210d, and/or the location of the image of the equipment 210d within the aggregated image content of the equipment site 204c can be provided to the server 219 as part of the user-generated input.

In one or more embodiments, the server 219 can identify the equipment 210d according to the received user-generated input. For example, the server 219 can look up an image of the equipment 210d by its name and access the image of the equipment 210d from a library or database of equipment images. In another example, the server 219 can look up an image of the equipment 210d by the received image of the equipment 210d (utilizing image recognition techniques) and access the image of the equipment 210d from a library or database of equipment images.

In one or more embodiments, the server 219 can receive user-generated input from communication device 224b1.

The user-generated input can indicate equipment 216d. For example, the communication device 224b1 can render the GUI associated with the design software application, which displays the aggregated image content 204c of the equipment site. The GUI can include a dialog box in which the user 222b1 can input the name of equipment 216d. Upon receiving the name of the equipment, the GUI can provide an image of the equipment from a library of equipment images such that the user 222b1 can select the image and place it at a location within the aggregate image of the equipment site 204c. In another example, the GUI can provide an access to a library of images of different equipment from which the user 222b1 can utilize a drag and drop feature of the GUI to select an image of equipment 216d from a group of equipment images and move the image onto location within the aggregated image content of the equipment site 204c. The image of the equipment 216d, name of the equipment 216d, type of equipment 216d, and/or the location of the image of the equipment 216d within the aggregated image content of the equipment site 204c can be provided to the server 219 as part of the user-generated input.

In one or more embodiments, the server 219 can identify the equipment 216d according to the received user-generated input. For example, the server 219 can look up an image of the equipment 216d by its name and access the image of the equipment 216d from a library or database of equipment images. In another example, the server 219 can look up an image of the equipment 216d by the received image of the equipment 216d (utilizing image recognition techniques) and access the image of the equipment 216d from a library or database of equipment images.

In one or more embodiments, the server 219 can adjust the aggregated image content by incorporating the images of equipment 210d and equipment 216d resulting in aggregated image content 204d, which can include, but are not limited to, a group of still images, Lidar scans, 3D environment templates, video content, group of video content, virtual reality video content, augmented reality video content, or a combination thereof. Further, the server 219 can provide the adjusted aggregated image content 204d to each of communication device 224a1 and communication device 224b1, each of which can render the adjusted aggregated image content on their respective displays utilizing the design software application.

Referring to FIG. 2E, in one or more embodiments, the server 219 can receive user-generated input over communication network 217 from communication device 224a1 that indicates the selection, equipment type, location, and/or installation of equipment 212e on the aggregated image content of equipment site 204e (as described herein) via the GUI of the design software application. Further, the server 219 can adjust the aggregated image content of the equipment site 204d by incorporating the image of equipment 212e resulting in adjusted aggregated image content 204e. In addition, the server 219 can provide the adjusted aggregated image content 204e to communication device 224a1 and communication device 224b1 over communication network 217. Also, communication device 224a1 and communication device 224b1 can render adjusted aggregated image content 204e on their respective display.

In one or more embodiments, the server 219 can analyze the adjusted aggregated image content 204e of the equipment site utilizing a machine learning application of the design software application, which can include image recognition techniques resulting in an analysis. In response to the analyzing of the adjusted aggregated image content 204e of the equipment site, the server 219 can determine that the installation of equipment 212e at the location designated does not satisfy one or more installation thresholds associated with the equipment site 204e resulting in a determination. Such a determination can be based on the location, equipment type, power requirements of the equipment 210d and equipment 212e, or any other factor associated with equipment 210d or equipment 212e such that both equipment 210d and equipment 212e can function properly on equipment site 204e. Further, the installation thresholds can include distance, power, bandwidth support, processing power, memory capacity, etc.) For example, the server 219 can determine the distance 226 between equipment 210d and equipment 212e and determine that distance 226 does not satisfy a distance threshold. Operator personnel can configure installation thresholds including a distance threshold between equipment and/or types of equipment for a variety of reasons include maintaining sufficient clearance between equipment for cooling, operator access, etc. Further, based on the determination that the installation of equipment 212e does not satisfy one or more installation thresholds, the server 219 can provide a notification 225e to communication device 224a1 and communication device 224b1 over communication network 217 that indicates that the installation of equipment 212e does not satisfy one or more installation thresholds. The notification can be a message to the GUI of the design software application, email message, text message, alert, or any other message, and or a visual indicator rendered on the GUI to communication device 224a1 and communication device 224b1. In response to the notification, either user 222a1 or user 222b1 can provide further instructions, the via the GUI of the design software application, to adjust the location or equipment type associated with equipment 210d or equipment 212e to satisfy the one or more installation thresholds.

Figure 2F:
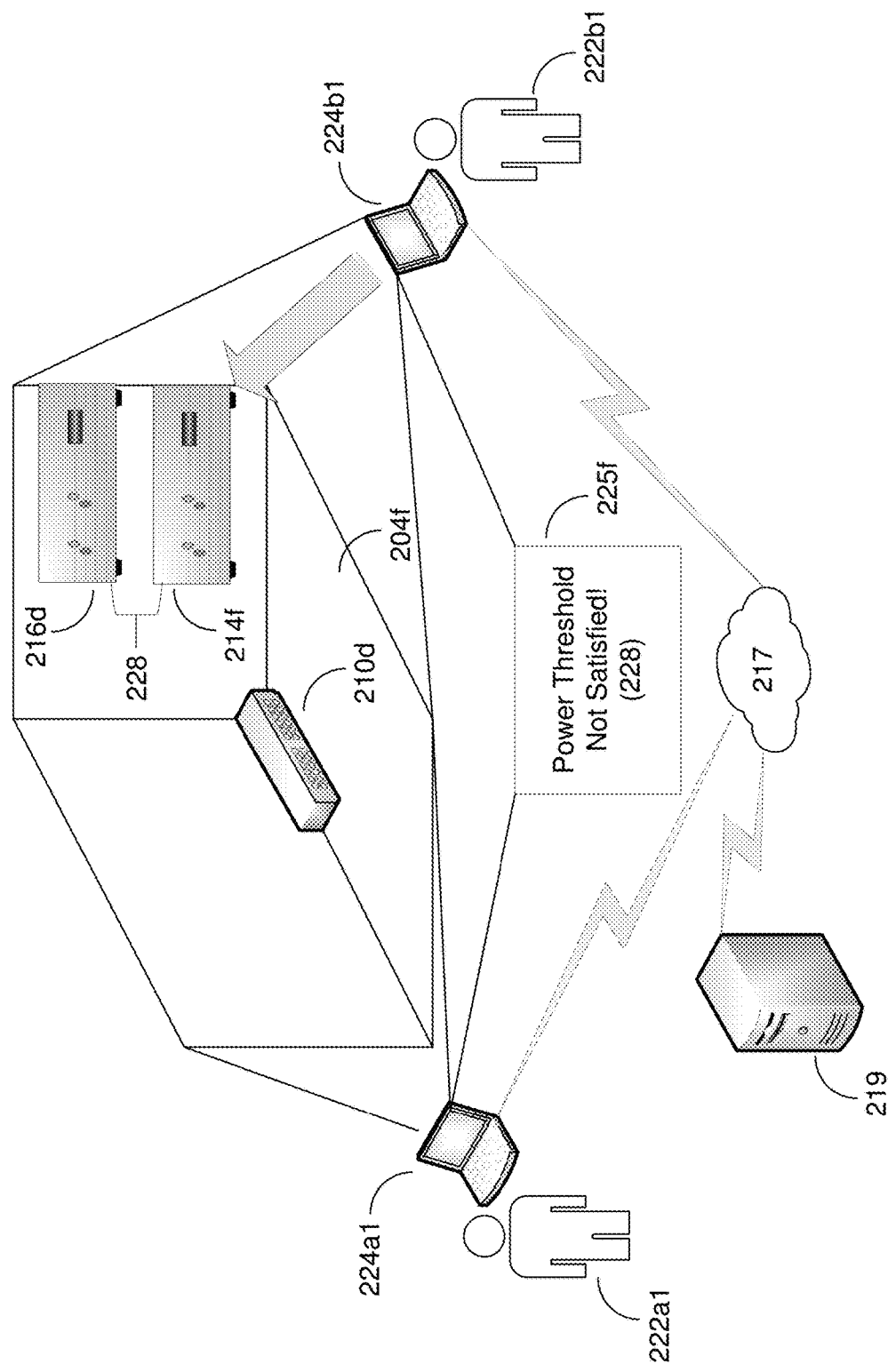

Referring to FIG. 2F, in one or more embodiments, the server 219 can receive user-generated input over communication network 217 from communication device 224b1 that indicates the selection, equipment type, location, and/or installation of equipment 214f on the aggregated image content of equipment site 204f (as described herein) via the GUI of the design software application. Further, the server 219 can adjust the aggregated image content of the equipment site 204d by incorporating the image of equipment 214f resulting in adjusted aggregated image content 204f. In addition, the server 219 can provide the adjusted aggregated image content 204f to communication device 224a1 and communication device 224b1 over communication network 217. Also, communication device 224a1 and communication device 224b1 can render adjusted aggregated image content 204f on their respective display.

In one or more embodiments, the server 219 can analyze the adjusted aggregated image content 204f of the equipment site utilizing a machine learning application of the design software application, which can include image recognition techniques resulting in an analysis. In response to the analyzing of the adjusted aggregated image content 204f of the equipment site, the server 219 can determine that the installation of equipment 214f at the location designated does not satisfy one or more installation thresholds associated with the equipment site 204f resulting in a determination. Such a determination can be based on the location, equipment type, power requirements of the equipment 216d and equipment 214f, or any other factor associated with equipment 216d or equipment 214f such that both equipment 216d and equipment 214f can function properly on equipment site 204f. For example, the server 219 can determine that power requirements for both equipment 216*d* and equipment 214*f* as well as determine that both equipment 216*d* and equipment 214*f* are on the same power line. Further, the server can determine that both equipment 216*d* and equipment 214*f* draw a total power that does not satisfy a power threshold associated with the power line. Operator personnel can configure installation thresholds prior to design of the equipment site including a power threshold among equipment and/or types of equipment for a variety of reasons include maintain power balance, below power threshold, reduce heat accumulation on a rack of equipment, etc. Further, based on the determination that the installation of equipment 214*f* does not satisfy one or more installation thresholds, the server 219 can provide a notification 225*f* to communication device 224*a*1 and communication device 224*b*1 over communication network 217 that indicates that the installation of equipment 214*f* does not satisfy one or more installation thresholds. In response to the notification, either user 222*a*1 or user 222*b*1 can provide further instructions to adjust the location or equipment type associated with equipment 216*d* or equipment 214*f* to satisfy the one or more installation thresholds.

Referring to FIG. 2G, in one or more embodiments, equipment site 204*g* within a telecommunications operations center 202*g*. Operator personnel 230*g* can install equipment 206*g*, equipment 208*g*, equipment 210*g*, equipment 212*g*, equipment 214*g*, and equipment 216*g* according to an equipment site design that can be collaborated by different operator personnel as described herein. After operator personnel 230*g* installs the equipment 206*g*, 208*g*, 210*g*, 212*g*, 214*g*, 216*g* on equipment site 204*g*, the operator personnel 230*g* can capture a group of image content of the equipment site 204*g* utilizing a camera of communication device 231*g*. The communication device 231*g* can comprise a mobile device, mobile phone, tablet computer, laptop computer, or any other communication device. Further, the group of image content can be provided by the communication device 231*g* to the server 219 over communication network 217. Further, the server 219 can aggregate the group of image content resulting in aggregated image content, which can include, but are not limited to, a group of still images, Lidar scans, 3D environment templates, video content, group of video content, panoramic video content, virtual reality video content, augmented reality video content, etc. In addition, the server 219 can provide the aggregated image content 204*g* to communication device 224*a*1 and communication device 224*b*1 over communication device 217. Communication device 224*a*1 and communication device 224*b*1 can render the aggregated image content 204*g* on their respective display.

In one or more embodiments, server 219, utilizing the design software application, can analyze the aggregated image content 204*g* utilizing machine learning application of the design software application, which can include image recognition techniques, resulting in an analysis. In response to the analyzing of the aggregated image content 204*g*, can determine the completed installation of the equipment 206*g*, 208*g*, 210*g*, 212*g*, 214*g*, 216*g* does not satisfy one or more installation thresholds. For example, the server 219 can determine that the distance 232*g* between equipment 206*g* and equipment 208*g* does not satisfy a distance threshold. In another example, the server 219 can determine that the power requirement between equipment 214*g* and equipment 216*g* does not satisfy a power threshold. That is, the power drawn by equipment 214*g* and equipment 216*g* on a power line can draw a power imbalance, or above a power threshold for the power line.

In one or more embodiments, the server 219 can provide a notification to communication device 224*a*1, communication device 224*b*1, and communication device 231*g* that indicates the completed installation does not satisfy one or more installation thresholds. Based on the notification, the operator personnel 230*g* can adjust the installation of the equipment 206*g*, 208*g*, 210*g*, 212*g*, 214*g*, 216*g* to satisfy the one or more installation thresholds. The operator personnel 230*g* can capture a group of image content of the equipment site 204*g* after adjusting the installation based on the notification utilizing a camera of communication device 231*g*. Further, the group of image content can be provided by the communication device 231*g* to the server 219 over communication network 217. Further, the server 219 can aggregate the group of image content resulting in aggregated image content, which can include, but are not limited to, a group of still images, Lidar scans, 3D environment templates, video content, group of video content, panoramic video content, virtual reality video content, augmented reality video content, etc. In addition, the server 219 can provide the aggregated image content 204*g* to communication device 224*a*1 and communication device 224*b*1 over communication device 217. Communication device 224*a*1 and communication device 224*b*1 can render the aggregated image content 204*g* on their respective display to allow user 224*a*1 and user 224*b*1 to view the corrected installation of the equipment 206*g*, 208*g*, 210*g*, 212*g*, 214*g*, 216*g* on the equipment site 204.

In one or more embodiments, server 219 can analyze the aggregated image content 204*g* utilizing machine learning application of the design software application, which can include image recognition techniques, resulting in an analysis. In response to the analyzing of the aggregated image content 204*g*, can determine the adjusted installation of the equipment 206*g*, 208*g*, 210*g*, 212*g*, 214*g*, 216*g* does satisfy one or more installation thresholds.

Figure 2H:
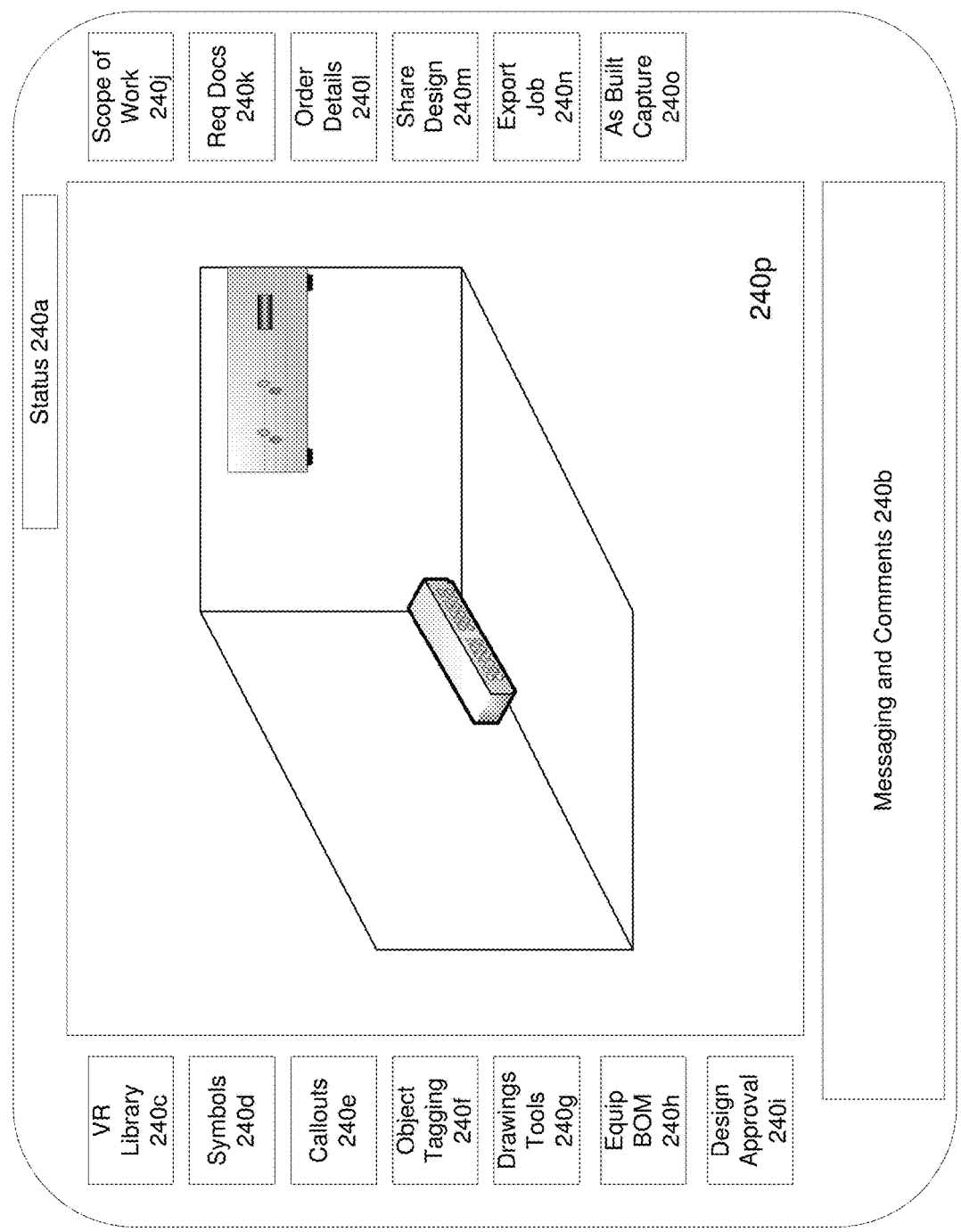

Referring to FIG. 2H, in one or more embodiments, a graphical user interface (GUI) 240 associated with a design software application for an equipment site described herein is shown. The GUI 240 of the design software application can be used to design an equipment site among different operator personnel that are stakeholders in the equipment site. In some embodiments, the GUI can be used to render a virtual reality environment to design the equipment site. In addition, the GUI can comprise a status bar 240*a* that can indicate whether the design of the equipment site has been approved by the stakeholders/operator personnel. In addition, the GUI can comprise a messaging and comments dialog box 240*b* to allow different operator personnel to communicate with each other regarding the design of the equipment site. Also, the GUI 240 can comprise a display window 240*p* that can render aggregated image content of the equipment site. The aggregated image content can comprise a group of still images, Lidar scans, 3D environment templates, video content, group of video content, panoramic video content, virtual reality video content, augmented reality video content, etc.

In one or more embodiments, the GUI 240 can comprise a group of operation buttons that can include virtual reality (VR) Library 240*c*, Symbols 240*d*, Callouts 240*e*, Object Tagging 240*f*, Drawing Tools 240*g*, Equipment Bill of Materials 240*h*, Design Approval 240*i*, Scope of Work 240*j*, Required Documents 240*k*, Order Details 240*l*, Share Design 240*m*, Export Job 240*n*, As Built Capture 240*o*. The operation buttons can be operated using a touchscreen, gesture, mouse, keyboard, or another input device/mechanism. Further, the VR Library 240*c* operator button can allow a user of the GUI to access a library of virtual reality image content (or any other type of image content) of different equipment for an equipment site that can be placed in the display window 240*p*. In addition, the Symbols operator button can allow a user to place different symbols within the display window 240*p*. The symbols can indicate power, direction, or access associated with the equipment. Also, the Callouts operator button can allow a user to place a callout that can provide directions to the installer regarding the equipment to be installed on the equipment site. Also, the Object Tagging operator button can allow a user to tag an image of equipment with an indicator regarding installation. Further, the Drawing Tools operator button can allow a user to draw an image onto the display window. In some embodiments, the image can be a piece of equipment that may not be in the VR library. In other embodiments, the image can be some indicator to the installer regarding the installation of the equipment on the equipment site. In addition, the Equipment Bill of Materials 240*h* operator button allows the user to access the bill of materials associated with the equipment to be installed on the equipment site. Also, the Equipment Bill of Materials 240*h* operator button allows the user to order the equipment to be delivered to the equipment site. That is, the design software application can send a message (email, text, notification, etc.) to a vendor of the equipment associated with the order. Further, the Design Approval operator button allows the user to approve the design of the equipment site.

In one or more embodiments, the Scope of Work 240*j* operator button allows the user to access the scope of work that can be provided to the installer of the equipment on the equipment site. Further, the Requirement Documents 240*k* operator button can allow the user to access the requirements document associated with the equipment site. The requirements can indicate the functions of the equipment site and the type of equipment needed to perform the functions. In addition, the Order Details 240*l* operator button can allow the user to access the details of the equipment order associated with the equipment of the equipment site. Also, the Share Design 240*m* operator button can allow a user to share the design of the equipment site to other operator personnel including the installer. The sharing of the design can be via email, document sharing tool, image sharing tool, etc. Further, the Export Job 240*n* operator button allows a user to export the design to another software application. In addition, the As Built Capture 240*o* operator button allows an installer to capture images of the completed installation of the equipment site and/or allows a user to access image content associated with the completed installation to be aggregated and rendered on the GUI 240.

Figure 2I:
FIGS. 2I-2O depict illustrative embodiments of methods in accordance with various aspects described herein.

FIGS. 2I-2O depict illustrative embodiments of methods in accordance with various aspects described herein. Referring to FIG. 2I, in one or more embodiments, method 250 for designing an equipment site utilizing a design software application, which can be implemented by a server described herein. The method can include the server, at 250*a*, obtaining a first group of image content of an equipment site. Further, the method can include the server, at 250*b*, aggregating the first group of image content resulting in first aggregated image content, which can include, but not limited to, a group of still images, Lidar scans, 3D environment templates, video content, group of video content, panoramic video content, virtual reality video content, augmented reality video content (all aggregated image content described herein can be a group of still images, Lidar scans, 3D environment templates, video content, group of video content, panoramic video content, virtual reality video content, augmented reality video content). In addition, the method 250 can include the server, at 250*c*, providing the first aggregated image content to a group of communication devices. Each of the group of communication devices render the first aggregated image content on a respective display of each of the group of communication devices. In some embodiments, the first aggregated image content is rendered using the design software application described herein on each of the group of communication devices. Also, the method 250 can include the server, at 250*d*, receiving first user-generated input from a first communication device of the group of communication devices. Further, the method 250 can include the server, at 250*e*, identifying first equipment to install at the equipment site according to the first user-generated input. In addition, the method 250 can include the server, at 250*f*, adjusting the first aggregated image content by incorporating an image of the first equipment resulting in a second aggregated image content.

In one or more embodiments, the method 250 can include the server, at 250*g*, receiving second user-generated input from a second communication device of the group of communication devices. Further, the method 250 can include the server, at 250*h*, identifying second equipment to install at the equipment site according to the second user-generated input. In addition, the method 250 can include the server, at 250*i*, adjusting the second aggregated image content by incorporating an image of the second equipment resulting in a third aggregated image content. Also, the method 250 can include the server, at 250*j*, analyzing the third aggregated image content utilizing a machine learning application of the design software application. Further, the method 250 can include the server, at 250*k*, determining that installation of the second equipment does not satisfy an installation threshold resulting in a first determination. In some embodiments, the determining that installation of the second equipment does not satisfy an installation threshold resulting in a first determination can be in response to analyzing the third aggregated image content utilizing a machine learning application of the design software application. In addition, the method 250 can include the server, at 250*l*, providing a first notification indicating the installation of the second equipment does not satisfy the installation threshold based on the first determination to each of the group of communication devices.

In one or more embodiments, the method 250 can include the server, at 250*m*, receiving third user-generated input from the second communication device of the group of communication devices. Further, the method 250 can include the server, at 250*n*, identifying third equipment to install at the equipment site according to the third user-generated input. In addition, the method 250 can include the server, at 250*o*, adjusting the third aggregated image content by incorporating an image of the third equipment resulting in a fourth aggregated image content. Also, the method 250 can include the server, at 250*p*, analyzing the fourth aggregated image content utilizing the machine learning application of the design software application. Further, the method 250 can include the server, at 250*q*, determining that installation of the third equipment does satisfy the installation threshold resulting in a second determination. In some embodiments, the determining that installation of the third equipment does satisfy the installation threshold resulting in a second determination can be in response to analyzing the fourth aggregated image content utilizing the machine learning application of the design software application. In addition, the method 250 can include the server, at 250*r*, providing a second notification indicating the installation of the third equipment satisfies the installation threshold based on the second determination to each of the group of communication devices. Also, the method 250 can include the server, at 250s, providing the fourth aggregated image content to the group of communication devices. Each of the group of communication devices renders the fourth aggregated image content on the respective display of each group of communication devices. Further, the method 250 can include the server, at 250t, ordering a group of equipment for the equipment site, the group of equipment comprises the first equipment and the third equipment.

Figure 2J:
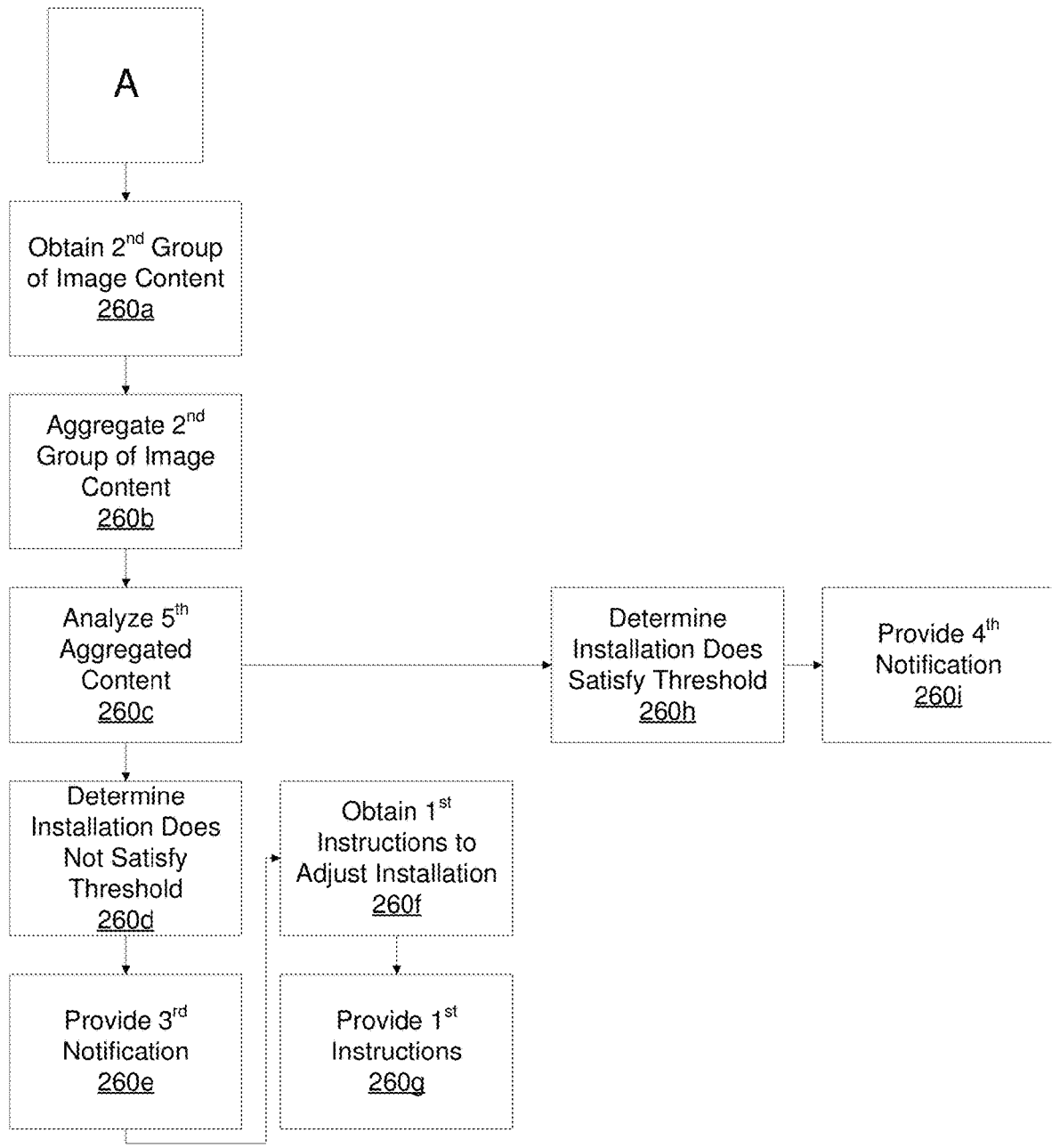

Referring to FIG. 2J, in one or more embodiments, method 260 for designing an equipment site utilizing a design software application, which can be implemented by a server. The method 260 can include the server, at 260a, obtaining a second group of image content of the equipment site from a third communication device associated with an installer of equipment associated with the equipment site. Further, the method 260 can include the server, at 260b, aggregating the second group of image content resulting in a fifth aggregated image content. The fifth aggregated image content shows a completed installation of the equipment at the equipment site. In addition, the method 260 can include the server, at 260c, analyzing the fifth aggregated image content utilizing the machine learning application of the design software application. Also, the method 260 can include the server, at 260d, determining the completed installation of the equipment does not satisfy the installation threshold resulting in a third determination. In some embodiments, the determining the completed installation of the equipment does not satisfy the installation threshold resulting in a third determination can be in response to analyzing the fifth aggregated image content utilizing the machine learning application of the design software application. Further, the method 260 can include the server, at 260e, providing a third notification indicating that the completed installation of the equipment does not satisfy the installation threshold based on the third determination to each of the group of communication devices. In addition, the method 260 can include the server, at 260f, obtaining first instructions from a fourth communication device indicating to adjust the completed installation of the equipment. Also, the method 260 can include the server, at 260g, providing the first instructions to the third communication device associated with the installer of the equipment associated with the equipment site. The installer can adjust the installation according to the first instructions and captured images of the adjusted/completed installation of the equipment site that can be aggregated. In additional embodiments, the method 260 can include the server, at 260h, determining the completed (adjusted) installation of the equipment does satisfy the installation threshold resulting in a fourth determination. In some embodiments, the determining of the completed installation of the equipment does satisfy the installation threshold resulting in a fourth determination can be in response to analyzing the fifth aggregated image content utilizing the machine learning application of the design software application. Further, the method 260 can include the server, at 260i, providing a fourth notification indicating that the completed installation of the equipment does satisfy the installation threshold based on the fourth determination to each of the group of communication devices.

In further embodiments, the machine learning application can comprise image recognition techniques, and the analyzing of the third aggregated image content utilizing the machine learning application comprises analyzing the third aggregated image content utilizing the image recognition techniques.

Figure 2K:
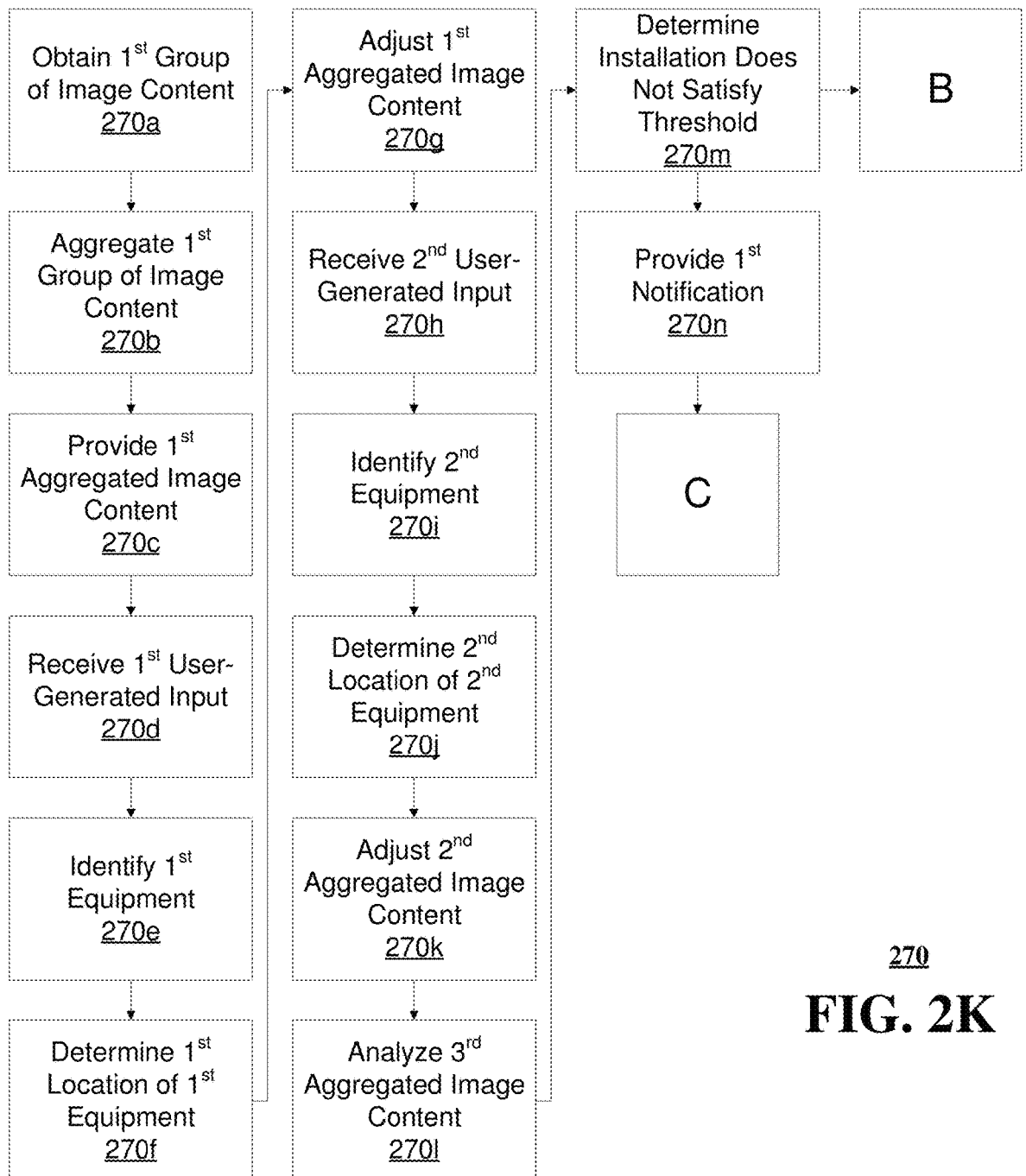

Referring to FIG. 2K, in one or more embodiments, method 270 for designing an equipment site utilizing a design software application, which can be implemented by a server. The method 270 can include the server, at 270a, obtaining a first group of image content of an equipment site. Further, the method 270 can include the server, at 270b, aggregating the first group of image content resulting in first aggregated image content. In addition, the method 270 can include the server, at 270c, providing the first aggregated image content to a group of communication devices. Each of the group of communication devices renders the first aggregated image content on a respective display of each of the group of communication devices utilizing the design software application. Also, the method 270 can include the server, at 270d, receiving first user-generated input from a first communication device of the group of communication devices. Further, the method 270 can include the server, at 270e, identifying first equipment to install at the equipment site according to the first user-generated input. In addition, the method 270 can include the server, at 270f, determining a first location associated with the first equipment within the equipment site according to the first user-generated input. Also, the method 270 can include the server, at 270g, adjusting the first aggregated image content by incorporating an image of the first equipment according to the first location resulting in a second aggregated image content. Further, the method 270 can include the server, at 270h, receiving second user-generated input from a second communication device of the group of communication devices. In addition, the method 270 can include the server, at 270i, identifying second equipment to install at the equipment site according to the second user-generated input. Also, the method 270 can include the server, at 270j, determining a second location associated with the second equipment within the equipment site according to the second user-generated input. Further, the method 270 can include the server, at 270k, adjusting the second aggregated image content by incorporating an image of the second equipment according the second location resulting in a third aggregated image content. In addition, the method 270 can include the server, at 270l, analyzing the third aggregated image content utilizing a machine learning application of the design software application. Also, the method 270 can include the server, at 270m, determining that installation of the second equipment at the second location does not satisfy an installation threshold resulting in a first determination. In some embodiments, the determining that installation of the second equipment at the second location does not satisfy an installation threshold resulting in a first determination can be in response to analyzing the third aggregated image content utilizing a machine learning application of the design software application. Further, the method 270 can include the server, at 270n, providing a first notification indicating the installation of the second equipment does not satisfy the installation threshold based on the first determination to each of the group of communication devices.

Figure 2L:
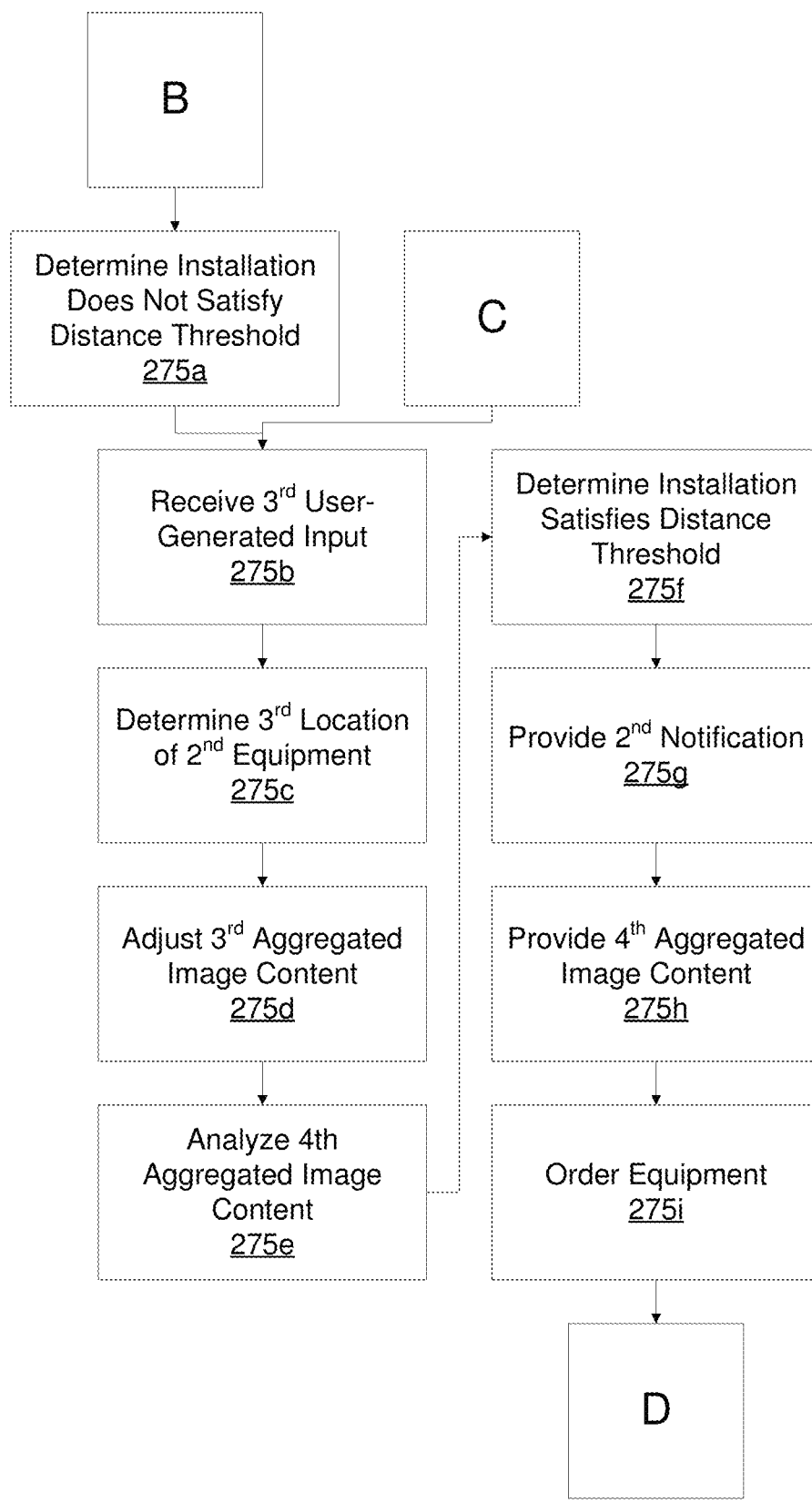

Referring to FIG. 2L, in one or more embodiments, the method 275 can implement designing of an equipment site utilizing a design software application, which can be implemented by a server. The installation threshold comprises a distance threshold. Further, the method 275 can include the server, at 275a, determining that the installation of the second equipment at the second location does not satisfy the distance threshold. In addition, the method 275 can include the server, at 275*b*, receiving a third user-generated input from the second communication device of the group of communication devices. Also, the method 275 can include the server, at 275*c*, determining a third location associated with the second equipment within the equipment site according to the third user-generated input. Also, the method 275 can include the server, at 275*d*, adjusting the third aggregated image content according to the third location resulting in a fourth aggregated image content. Further, the method 275 can include the server, at 275*e*, analyzing the fourth aggregated image content utilizing the machine learning application of the design software application. In addition, the method 275 can include the server, at 275*f*, determining that installation of the second equipment at the third location does satisfy the distance threshold resulting in a second determination. In some embodiments, determining that installation of the second equipment at the third location does satisfy the distance threshold resulting in a second determination can be in response to analyzing the fourth aggregated image content utilizing the machine learning application of the design software application. Also, the method 275 can include the server, at 275*g*, providing a second notification indicating the installation of the second equipment at the second location satisfies the installation threshold based on the second determination to each of the group of communication devices. Further, the method 275 can include the server, at 275*h*, providing the fourth aggregated image content to the group of communication devices. Each of the group of communication devices render the fourth aggregated image content on the respective display of each group of communication devices utilizing the design software application. The method 275 can include the server, at 275*i*, ordering a group of equipment for the equipment site via a GUI associated with generating the design of the equipment site. The group of equipment comprises the first equipment and the second equipment.

Figure 2M:
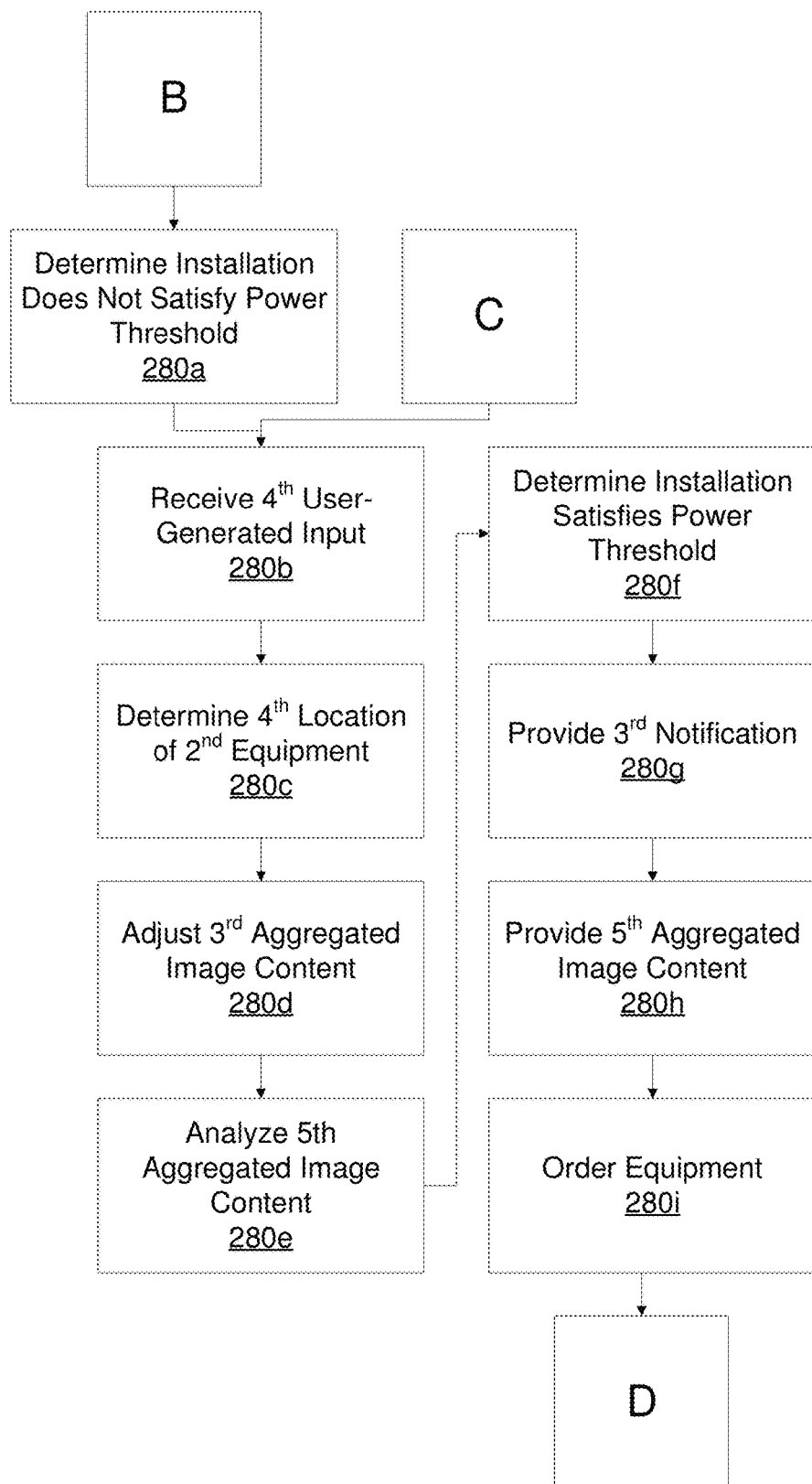

Referring to FIG. 2M, in one or more embodiments, the method 280 can implement designing of an equipment site utilizing a design software application, which can be implemented by a server. The installation threshold comprises a power threshold. Further, the method 280 can include the server, at 280*a*, determining that the installation of the second equipment at the second location does not satisfy the power threshold. In addition, the method 280 can include the server, at 280*b*, receiving a fourth user-generated input from the second communication device of the group of communication devices. Also, the method 280 can include the server, at 280*c*, determining a fourth location associated with the second equipment within the equipment site according to the fourth user-generated input. Also, the method 280 can include the server, at 280*d*, adjusting the third aggregated image content according to the fourth location resulting in a fifth aggregated image content. Further, the method 280 can include the server, at 280*e*, analyzing the fifth aggregated image content utilizing the machine learning application of the design software application. In addition, the method 280 can include the server, at 280*f*, determining that installation of the second equipment at the fourth location does satisfy the power threshold resulting in a third determination. In some embodiments, the determining that installation of the second equipment at the fourth location does satisfy the power threshold resulting in the third determination can be in response to analyzing the fifth aggregated image content utilizing the machine learning application of the design software application. Also, the method 280 can include the server, at 280*g*, providing a third notification indicating the installation of the second equipment at the second location satisfies the installation threshold based on the third determination to each of the group of communication devices. Further, the method 280 can include the server, at 280*h*, providing the fifth aggregated image content to the group of communication devices. Each of the group of communication devices render the fifth aggregated image content on the respective display of each group of communication devices. The method 280 can include the server, at 280*i*, ordering a group of equipment for the equipment site via the GUI associated with generating the design of the equipment site. The group of equipment comprises the first equipment and the second equipment.

Figure 2N:

Referring to FIG. 2N, in one or more embodiments, in one or more embodiments, the method 285 can implement designing of an equipment site utilizing a design software application, which can be implemented by a server. Method 285 can include the server, at 285*a*, obtaining a second group of image content of the equipment site from a third communication device associated with an installer of equipment associated with the equipment site. Further, the method 285 can include the server, at 285*b*, aggregating the second group of image content resulting in a sixth aggregated image content. The sixth aggregated image content shows a completed installation of the equipment at the equipment site. In addition, the method 285 can include the server, at 285*c*, analyzing the sixth aggregated image content utilizing the machine learning application of the design software application. Also, the method 285 can include the server, at 285*d*, determining the completed installation of the equipment does not satisfy the installation threshold resulting in a fourth determination. In some embodiments, the determining the completed installation of the equipment does not satisfy the installation threshold resulting in a fourth determination can be in response to analyzing the sixth aggregated image content utilizing the machine learning application of the design software application. Further, the method 285 can include the server, at 285*e*, providing a fourth notification indicating that the completed installation of the equipment does not satisfy the installation threshold based on the fourth determination to each of the group of communication devices. In addition, the method 285 can include the server, at 285*f*, obtaining first instructions from a fourth communication device indicating to adjust completed installation of the equipment. Also, the method 285 can include the server, at 285*g*, providing the first instructions to the third communication device associated with the installer of the equipment associated with the equipment site. The installer can adjust the installation of the equipment according to the first instructions and capture images of the completed (adjusted) installation of equipment and provide them to the server to be aggregated. Further, the method 285 can include the server, at 285*h*, determining a completed installation of the equipment does satisfy the installation threshold resulting in a fifth determination. In additional embodiments, the determining a completed installation of the equipment does satisfy the installation threshold resulting in a fifth determination can be in response to analyzing the sixth aggregated image content utilizing the machine learning application of the design software application. In addition, the method 285 can include the server, at 285*i*, providing a fifth notification indicating that the completed installation of the equipment does satisfy the installation threshold based on the fifth determination to each of the group of communication devices.

Figure 2O:
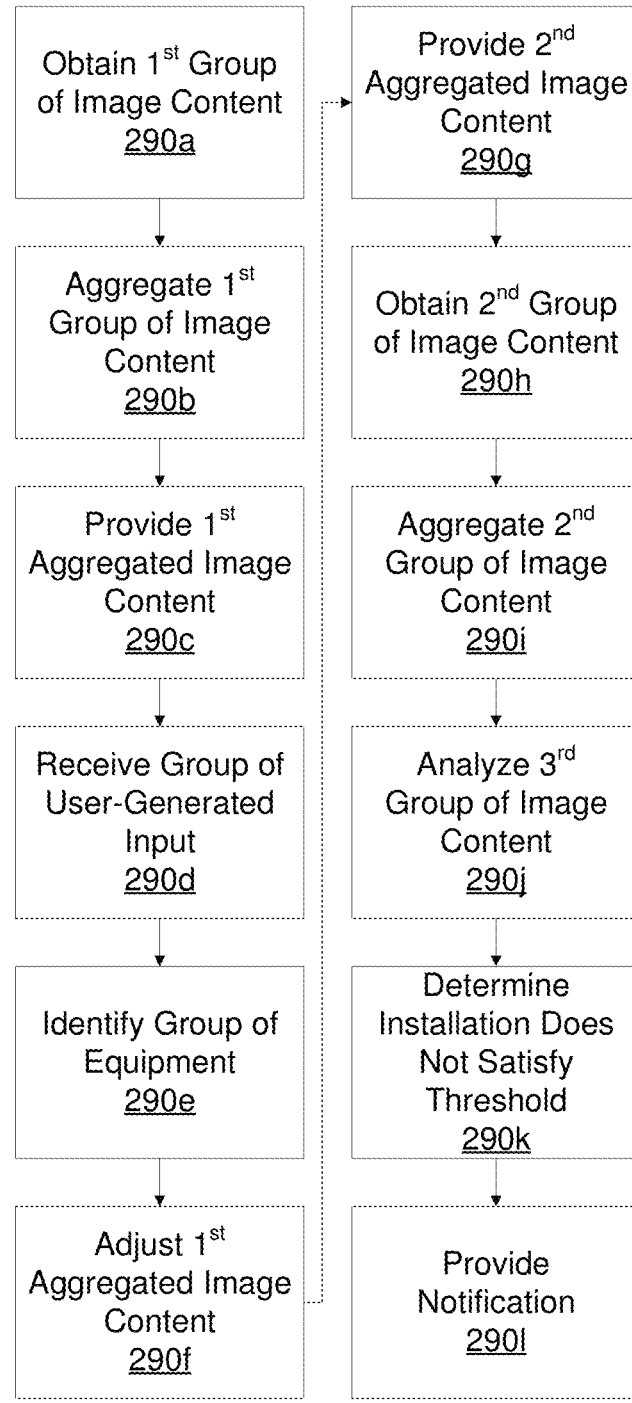

Referring to FIG. 2O, in one or more embodiments, in one or more embodiments, the method 290 can implement designing of an equipment site utilizing a design software application, which can be implemented by a server. The method 290 can include the server, at 290a, obtaining, by a processing system including a processor, a first group of image content of an equipment site. Further, the method 290 can include the server, at 290b, aggregating, by the processing system, the first group of image content resulting in first aggregated image content. In addition, the method 290 can include the server, at 290c, providing, by the processing system, the first aggregated image content to a group of communication devices. Each of the group of communication devices render the first aggregated image content on a respective display of each of the group of communication devices utilizing the designs software application. Also, the method 290 can include the server, at 290d, receiving, by the processing system, a group of user-generated input from a portion of the group of communication devices. Further, the method 290 can include the server, at 290e, identifying, by the processing system, a group of equipment to install at the equipment site according to the group of user-generated input. In addition, the method 290 can include the server, at 290f, adjusting, by the processing system, the first aggregated image content by incorporating images of the group of equipment resulting in a second aggregated image content. Also, the method 290 can include the server, at 290g, providing, by the processing system, the second aggregated image content to the group of communication devices. Each of the group of communication devices render the second aggregated image content on the respective display of each group of communication devices utilizing the design software application. Further, the method 290 can include the server, at 290h, obtaining, by the processing system, a second group of image content of the equipment site from a third communication device associated with an installer of equipment associated with the equipment site. In addition, the method 290 can include the server, at 290i, aggregating, by the processing system, the second group of image content resulting in a third aggregated image content. The third aggregated image content shows a completed installation of the equipment at the equipment site. Also, the method 290 can include the server, at 290j, analyzing, by the processing system, the third aggregated image content utilizing a machine learning application of the design software application. Further, the method 290 can include the server, at 290k, determining, by the processing system, the completed installation of the equipment does not satisfy an installation threshold resulting in a determination. In further embodiments, the determining, by the processing system, the completed installation of the equipment does not satisfy an installation threshold resulting in a determination can be in response to analyzing, by the processing system, the third aggregated image content utilizing a machine learning application of the design software application. In addition, the method 290 can include the server, at 290l, providing, by the processing system, a notification indicating that the completed installation of the equipment does not satisfy the installation threshold based on the determination to each of the group of communication devices. Other operator personnel associated with one of the communication devices of the group of communication devices can provide additional user-generated input that indicates to adjust the placement or location of the one of the equipment of the group of equipment on the equipment site.

While for purposes of simplicity of explanation, the respective processes are shown and described as a series of blocks in FIGS. 2I-2O, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. Further, one or more blocks can be performed in response to one or more other blocks.

Portions of some embodiments can be combined with portions of other embodiments.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of systems 200a, 200b, 200c, 200d, 200e, 200f, 200g, 240, and methods 250, 260, 270, 275, 280, 285, 290 presented in FIGS. 1, 2A-2O and 3. For example, virtualized communication network 300 can facilitate in whole or in part collaboratively design an equipment site.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements — which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers — each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
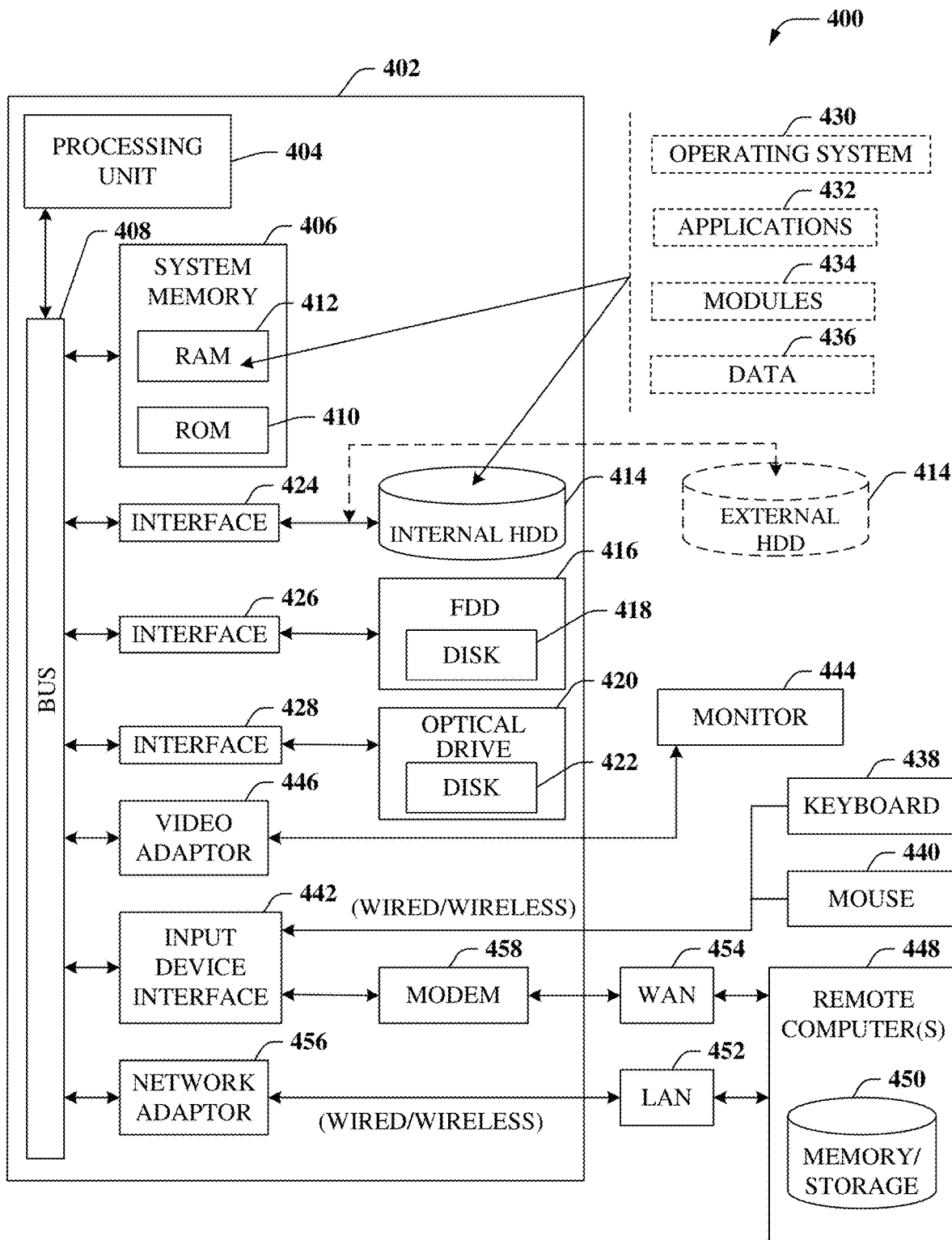
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part collaboratively design an equipment site. Further, server 219, communication devices 220, 224a1, 224b1, and 231g each comprise computing environment 400.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM),flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
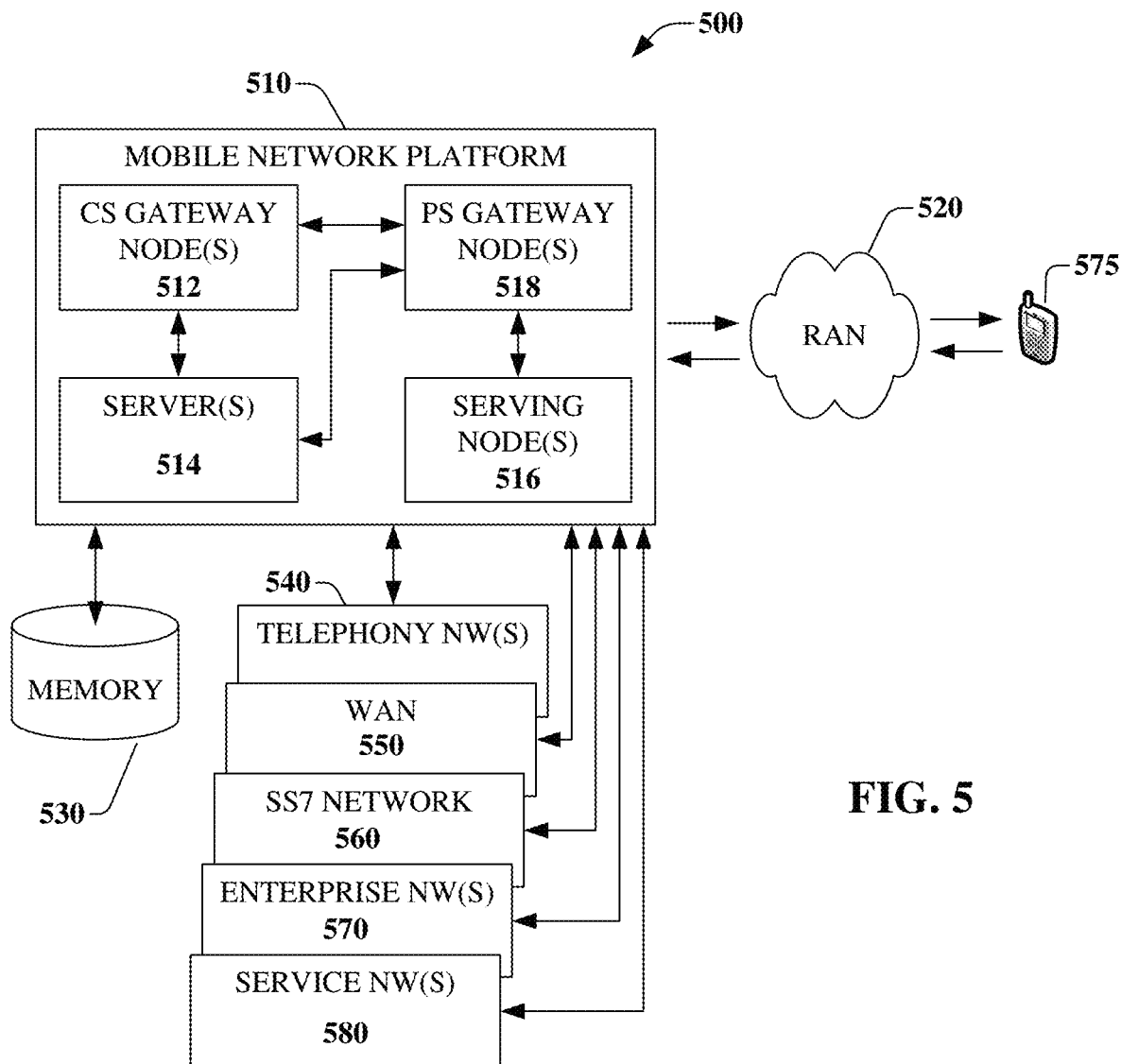
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part collaboratively design an equipment site. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
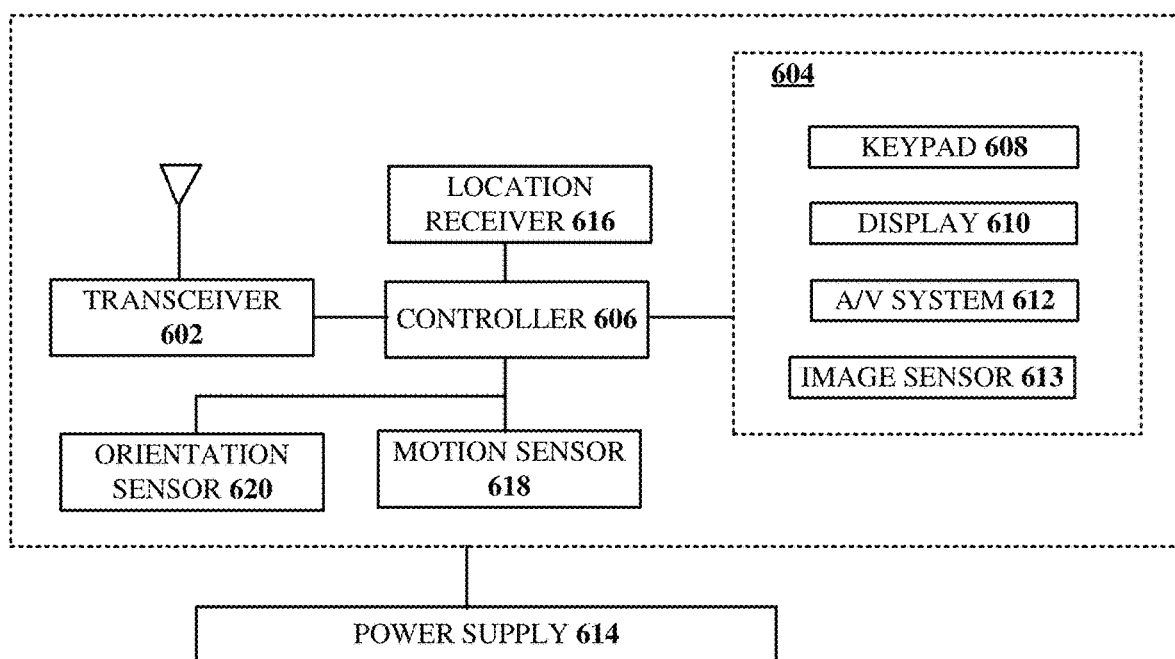
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, communication device 600 can facilitate in whole or in part collaboratively design an equipment site. Further, server 219, communication devices 220, 224a1, 224b1, and 231g each comprise communication device 600.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
   a processing system including a processor; and
   a memory that stores executable instructions that, when executed by the processing system, facilitate performance of operations, the operations comprising:
   obtaining a first group of image content of an equipment site;
   aggregating the first group of image content resulting in first aggregated image content;
   generating first virtual reality image content based on the first aggregated image content;
   generating a communication session among a group of communication devices;
   providing, over a communication network, the first virtual reality image content to the group of communication devices during the communication session, wherein each of the group of communication devices renders the first virtual reality image content on a respective graphical user interface of each of the group of communication devices, wherein the graphical user interface receives user-generated input associated with each user associated with each of the group of communication devices to interact with the first virtual reality image content;
   receiving, over the communication network, first user-generated input from a first communication device of the group of communication devices;
   identifying first equipment to install at the equipment site according to the first user-generated input;
   adjusting the first virtual reality image content by incorporating an image of the first equipment resulting in a second virtual reality image content;
   receiving, over the communication network, second user-generated input from a second communication device of the group of communication devices;
   identifying second equipment to install at the equipment site according to the second user-generated input;
   adjusting the second virtual reality image content by incorporating an image of the second equipment resulting in a third virtual reality image content;
   determining that installation of the second equipment does not satisfy an installation threshold resulting in a first determination in response to analyzing a fourth virtual reality image content associated with the installation of the second equipment utilizing a machine learning application;
   providing, over the communication network to each of the group of communication devices, a first notification indicating the installation of the second equipment does not satisfy the installation threshold based on the first determination;
   providing, over the communication network to a particular communication device associated with an equipment installer, instructions for adjusting the installation of the second equipment, wherein the instructions for the adjusting are obtained responsive to the providing the first notification;
   based on identifying an adjusted installation of the second equipment, determining that the adjusted installation satisfies the installation threshold resulting in a second determination, wherein the second determination is in response to analyzing, utilizing the machine learning application, a fifth virtual reality image content associated with the adjusted installation of the second equipment; and
   providing, over the communication network to each of the group of communication devices, a second notification indicating the adjusted installation of the second equipment satisfies the installation threshold based on the second determination, thereby facilitating collaborative design of the equipment site between the equipment installer and a plurality of users remote from the equipment site.

2. The device of claim 1, wherein the operations further comprise:
   receiving, over the communication network, third user-generated input from the second communication device of the group of communication devices;
   identifying third equipment to install at the equipment site according to the third user-generated input;
   adjusting the fifth virtual reality image content by incorporating an image of the third equipment resulting in sixth virtual reality image content;
   determining that installation of the third equipment does satisfy the installation threshold resulting in a third determination in response to analyzing a seventh virtual reality image content associated with the installation of the third equipment utilizing the machine learning application; and providing, over the communication network to each of the group of communication devices, a third notification indicating the installation of the third equipment satisfies the installation threshold based on the third determination.

3. The device of claim 2, wherein the operations comprise providing, over the communication network, the seventh virtual reality image content to the group of communication devices, wherein each of the group of communication devices renders the seventh virtual reality image content on the respective graphical user interface of each of the group of communication devices.

4. The device of claim 2, wherein the operations comprise ordering a group of equipment for the equipment site, wherein the group of equipment comprises the first equipment and the third equipment.

5. The device of claim 1, wherein the operations comprise:
  obtaining, over the communication network, a second group of image content of the equipment site from a third communication device associated with an installer of equipment associated with the equipment site; and
  aggregating the second group of image content resulting in an eighth virtual reality image content, wherein the eighth virtual reality image content shows a completed installation of the equipment at the equipment site.

6. The device of claim 5, wherein the operations comprise:
  determining the completed installation of the equipment does not satisfy the installation threshold resulting in a third determination in response to analyzing the fifth eighth virtual reality image content utilizing the machine learning application; and
  providing, over the communication network, a third notification indicating that the completed installation of the equipment does not satisfy the installation threshold based on the third determination to each of the group of communication devices.

7. The device of claim 6, wherein the operations comprise:
  obtaining, over the communication network, first instructions from a fourth communication device indicating to adjust the completed installation of the equipment; and
  providing, over the communication network, the first instructions to the third communication device associated with the installer of the equipment associated with the equipment site.

8. The device of claim 5, wherein the operations comprise:
  determining the completed installation of the equipment does satisfy the installation threshold resulting in a fourth determination in response to analyzing the fifth eighth virtual reality image content utilizing the machine learning application; and
  providing, over the communication network, a fourth notification indicating that the completed installation of the equipment does satisfy the installation threshold based on the fourth determination to each of the group of communication devices.

9. The device of claim 1, wherein the machine learning application comprises image recognition techniques, wherein the analyzing of the fourth or fifth virtual reality image content utilizing the machine learning application comprises analyzing the fourth or fifth virtual reality image content utilizing the image recognition techniques.

10. A non-transitory, machine-readable medium, comprising executable instructions that, when executed by a processing system including a processor, facilitate performance of operations, the operations comprising:
  obtaining a first group of image content of an equipment site;
  aggregating the first group of image content resulting in first aggregated image content;
  generating first virtual reality image content based on the first aggregated image content;
  generating a communication session among a group of communication devices;
  providing, over a communication network, the first virtual reality image content to the group of communication devices during the communication session, wherein each of the group of communication devices renders the first virtual reality image content on a respective graphical user interface of each of the group of communication devices, wherein the graphical user interface receives user-generated input associated with each user associated with each of the group of communication devices to interact with the first virtual reality image content;
  receiving, over the communication network, first user-generated input from a first communication device of the group of communication devices;
  identifying first equipment to install at the equipment site according to the first user-generated input;
  determining a first location associated with the first equipment within the equipment site according to the first user-generated input;
  adjusting the first virtual reality image content by incorporating an image of the first equipment according to the first location resulting in a second virtual reality image content;
  receiving, over the communication network, second user-generated input from a second communication device of the group of communication devices;
  identifying second equipment to install at the equipment site according to the second user-generated input;
  determining a second location associated with the second equipment within the equipment site according to the second user-generated input;
  adjusting the second virtual reality image content by incorporating an image of the second equipment according to the second location resulting in a third virtual reality image content;
  determining that installation of the second equipment at the second location does not satisfy an installation threshold resulting in a first determination in response to analyzing a fourth virtual reality image content associated with the installation of the second equipment utilizing a machine learning application;
  providing, over the communication network to each of the group of communication devices, a first notification indicating the installation of the second equipment does not satisfy the installation threshold based on the first determination;
  providing, over the communication network to a particular communication device associated with an equipment installer, instructions for adjusting the installation of the second equipment, wherein the instructions for the adjusting are obtained responsive to the providing the first notification;

based on identifying an adjusted installation of the second equipment, determining that the adjusted installation satisfies the installation threshold resulting in a second determination, wherein the second determination is in response to analyzing, utilizing the machine learning application, a fifth virtual reality image content associated with the adjusted installation of the second equipment; and providing, over the communication network to each of the group of communication devices, a second notification indicating the adjusted installation of the second equipment satisfies the installation threshold based on the second determination, thereby facilitating collaborative design of the equipment site between the equipment installer and a plurality of users remote from the equipment site.

11. The non-transitory, machine-readable medium of claim 10, wherein the installation threshold comprises a distance threshold, wherein the determining that the installation of the second equipment at the second location does not satisfy the installation threshold comprises determining that the installation of the second equipment at the second location does not satisfy the distance threshold.

12. The non-transitory, machine-readable medium of claim 11, wherein the operations comprise providing, over the communication network, the fifth virtual reality image content to the group of communication devices, wherein each of the group of communication devices renders the fifth virtual reality image content on the respective graphical user interface of each group of communication devices.

13. The non-transitory, machine-readable medium of claim 10, wherein the installation threshold comprises a power threshold, wherein the determining that the installation of the second equipment at the second location does not satisfy the installation threshold comprises determining that the installation of the second equipment at the second location does not satisfy the power threshold.

14. The non-transitory, machine-readable medium of claim 13, wherein the operations comprise providing, over the communication network, the fifth virtual reality image content to the group of communication devices, wherein each of the group of communication devices renders the fifth virtual reality image content on the respective graphical user interface of each group of communication devices.

15. The non-transitory, machine-readable medium of claim 13, wherein the operations comprise ordering a group of equipment for the equipment site, wherein the group of equipment comprises the first equipment and the second equipment.

16. The non-transitory, machine-readable medium of claim 10, wherein the operations comprise:
obtaining, over the communication network, a second group of image content of the equipment site from a third communication device associated with an installer of equipment associated with the equipment site; and
aggregating the second group of image content resulting in a sixth virtual reality image content, wherein the sixth virtual reality image content shows a completed installation of the equipment at the equipment site.

17. The non-transitory, machine-readable medium of claim 16, wherein the operations comprise:
determining the completed installation of the equipment does not satisfy the installation threshold resulting in a fourth determination in response to analyzing the sixth virtual reality image content utilizing the machine learning application; and
providing, over the communication network, a fourth notification indicating that the completed installation of the equipment does not satisfy the installation threshold based on the fourth determination to each of the group of communication devices.

18. The non-transitory, machine-readable medium of claim 17, wherein the operations comprise:
obtaining, over the communication network, first instructions from a fourth communication device indicating to adjust completed installation of the equipment; and
providing, over the communication network, the first instructions to the third communication device associated with the installer of the equipment associated with the equipment site.

19. The non-transitory, machine-readable medium of claim 16, wherein the operations comprise:
determining a completed installation of the equipment does satisfy the installation threshold resulting in a fifth determination in response to analyzing the sixth virtual reality image content utilizing the machine learning application; and
providing, over the communication network, a fifth notification indicating that the completed installation of the equipment does satisfy the installation threshold based on the fifth determination to each of the group of communication devices.

20. A method, comprising:
obtaining, by a processing system including a processor, a first group of image content of an equipment site;
aggregating, by the processing system, the first group of image content resulting in first aggregated image content;
generating, by the processing system, first virtual reality image content based on the first aggregated image content;
generating, by the processing system, a communication session among a group of communication devices;
providing, by the processing system, over a communication network, the first virtual reality image content to the group of communication devices during the communication session, wherein each of the group of communication devices renders the first virtual reality image content on a respective graphical user interface of each of the group of communication devices, wherein the graphical user interface receives user-generated input associated with each user associated with each of the group of communication devices to interact with the first virtual reality image content;
receiving, by the processing system, over the communication network, a group of user-generated input from a portion of the group of communication devices;
identifying, by the processing system, a group of equipment to install at the equipment site according to the group of user-generated input;
adjusting, by the processing system, the first virtual reality image content by incorporating images of the group of equipment resulting in a second virtual reality image content;
providing, by the processing system, over the communication network, the second virtual reality image content to the group of communication devices, wherein each of the group of communication devices renders the second virtual reality image content on the respective graphical user interface of each of the group of communication devices;
obtaining, by the processing system, over the communication network, a second group of image content of the equipment site from a third communication device associated with an installer of equipment associated with the equipment site;

aggregating, by the processing system, the second group of image content resulting in a third virtual reality image content, wherein the third virtual reality image content shows a completed installation of the equipment at the equipment site;

determining, by the processing system, the completed installation of the equipment does not satisfy an installation threshold resulting in a determination in response to analyzing, by the processing system, the third virtual reality image content utilizing a machine learning application;

providing, by the processing system, over the communication network to each of the group of communication devices, a notification indicating that the completed installation of the equipment does not satisfy the installation threshold based on the determination;

providing, by the processing system, over the communication network to the third communication device associated with the installer, instructions for adjusting the completed installation of the equipment, wherein the instructions for the adjusting are obtained responsive to the providing the notification;

based on identifying an adjusted installation of the equipment, determining, by the processing system, that the adjusted installation satisfies the installation threshold resulting in a second determination, wherein the second determination is in response to analyzing, utilizing the machine learning application, a fourth virtual reality image content associated with the adjusted installation of the equipment; and providing, by the processing system, over the communication network to each of the group of communication devices, a second notification indicating the adjusted installation of the equipment satisfies the installation threshold based on the second determination, thereby facilitating collaborative design of the equipment site between the installer and a plurality of users remote from the equipment site.

* * * * *